United States Patent
Kowalczyk et al.

(10) Patent No.: US 6,507,681 B1
(45) Date of Patent: Jan. 14, 2003

(54) ANTI-WAVEGUIDE ROUTING STRUCTURE

(75) Inventors: Tony C. Kowalczyk, Palo Alto, CA (US); William K. Bischel, Menlo Park, CA (US); Michael J. Brinkman, Redwood City, CA (US); Stanley Timothy Lau, Sunnyvale, CA (US)

(73) Assignee: Gemfire Corporation, Fremont, CA (US)

( * ) Notice: Subject to any disclaimer, the term of this patent is extended or adjusted under 35 U.S.C. 154(b) by 122 days.

(21) Appl. No.: 09/630,511

(22) Filed: Aug. 2, 2000

(51) Int. Cl.[7] ............................. G02B 6/26; G02B 6/42

(52) U.S. Cl. .................... 385/16; 385/140; 385/131

(58) Field of Search ................ 385/16, 140, 1–10, 385/129–133

(56) References Cited

U.S. PATENT DOCUMENTS

| | | |
|---|---|---|
| 3,801,185 A | 4/1974 | Ramaswamy et al. |
| 3,809,696 A | 5/1974 | Porret et al. |
| 3,809,732 A | 5/1974 | Chandross et al. |
| 3,953,620 A | 4/1976 | Chandross et al. |
| 3,993,485 A | 11/1976 | Chandross et al. |
| 4,648,687 A * | 3/1987 | Yoshida et al. ............... 385/16 |
| 4,712,854 A | 12/1987 | Mikami et al. |
| 4,738,502 A * | 4/1988 | Mikami et al. ............... 385/4 |
| 5,009,483 A | 4/1991 | Rockwell III |
| 5,045,847 A | 9/1991 | Tarui et al. |
| 5,106,181 A | 4/1992 | Rockwell III |

(List continued on next page.)

FOREIGN PATENT DOCUMENTS

| | | |
|---|---|---|
| EP | 0 412 675 A2 | 2/1991 |
| EP | 0 616 234 A2 | 9/1994 |
| EP | 0 642 052 A1 | 3/1995 |
| EP | 0 689 094 A1 | 12/1995 |
| EP | 0 981 064 A1 | 2/2000 |
| EP | 987580 * | 3/2000 |
| GB | 2 191 603 A | 12/1987 |
| WO | WO 92/00185 A1 | 1/1992 |
| WO | WO 98/45759 A1 | 10/1998 |

OTHER PUBLICATIONS

"Variable Optical Attenuator Based on a Cutoff Modulator with Tapered Waveguides in Polymers" by Lee et al, IEEE Journal of Lightwave Technology, vol. 17, No. 12.*

P.R. Ashley and E.A. Sornsin, "Doped optical claddings for waveguide devices with electrooptical polymers", IEEE Photonics Technology Letters, vol. 4, No. 9, Sep. 1992, pp. 1026–1028.

(List continued on next page.)

Primary Examiner—Hemang Sanghavi
Assistant Examiner—Scott A. Knauss
(74) Attorney, Agent, or Firm—Warren S. Wolfeld; Haynes, Beffel & Wolfeld LLP

(57) ABSTRACT

In a first state of an optical switch, a structure in the switch confines an optical mode to propagate along a first, unswitched path. The switch is switched into a second state by reducing the refractive index along the first path, or by increasing the refractive index of a region of the switch outside but adjacent to the first path, until the index within the first path is lower, preferably substantially lower, than that of the adjacent region. This creates an anti-waveguiding section in which light is forced to diverge from the unswitched path both by diffraction and refraction. The refractive index change is produced thermo-optically or electro-optically, for example. In a symmetric planar embodiment, upon actuation, light escapes from the confinement region into two beams deflected symmetrically in lateral directions while remaining vertically confined. In an asymmetric planar embodiment, upon actuation, light from the confinement region escapes in one direction away from the confinement region in the horizontal plane, while remaining confined vertically and in the opposite direction in the horizontal plane. A self-aligned method for fabricating optical switches is also described.

33 Claims, 9 Drawing Sheets

U.S. PATENT DOCUMENTS

| | | | |
|---|---|---|---|
| 5,159,699 A | | 10/1992 | de Monts |
| 5,402,514 A | | 3/1995 | Booth et al. |
| 5,544,268 A | | 8/1996 | Bischel et al. |
| 5,874,187 A | | 2/1999 | Colvin et al. |
| 5,932,397 A | | 8/1999 | Mustacich |
| 5,966,493 A | | 10/1999 | Wagoner et al. |
| 6,031,945 A | * | 2/2000 | You et al. ............ 385/130 |
| 6,035,083 A | | 3/2000 | Brennan III et al. |
| 6,122,416 A | * | 9/2000 | Ooba et al. ............ 359/115 |
| 6,208,798 B1 | | 3/2001 | Morozov et al. |
| 6,229,949 B1 | | 5/2001 | Ido et al. |
| 6,236,774 B1 | * | 5/2001 | Lackritz et al. ............ 385/10 |
| 6,282,361 B1 | | 8/2001 | Nishimura et al. |

OTHER PUBLICATIONS

B.L. Booth et al., "Polyguide™ polymeric technology for optical interconnect circuits and components", SPIE, vol. 3005, pp. 238–251.

W.S. Colburn and K.A. Haines, "Volume hologram formation in photopolymer materials", Applied Optics, vol. 10, No. 7, Jul. 1971, pp. 1636–1641.

J.E. Marchegiano et al., "Polyguide™ technology for passive optical interconnects". SPIE, vol. 2690, pp. 361–368.

G.B. McKenna, Chapter 10: Glass formation and glassy behavior, Volume 2: Polymer Properties, C. Booth and C. Price (vol. eds.), Comprehensive Polymer Science: the synthesis, characterization, reactions & applications of polymers, Sir Geoffrey Allen and J.C. Bevington (chairman and deputy chairman of the ed. board), Pergamon Press, Oxford (1989).

Robert H. Wopshall, "MB16. Dry photopolymer film for recording holograms", abstract of presentation, 1971 Spring Meeting, Journal of the Optical Society of America, vol. 61, 1971, p. 649.

Joshi, et al., "Three Dimensional Optical Circuitry Using Two–Photon–Assisted Polymerization," Applied Physics Letters, Jan. 11, 1999, vol. 74, No. 2, pp. 170–172.

F.R. Akkari et al., "Thermo–optic mode extinction modulation in polymeric waveguide structures", Journal of Non–Crystalline Solids, vol. 187, 1995, pp. 494–497.

Viitanen and Lekkala, "Fiber Optic Liquid Crystal Displays", SPIE, vol. 1976 High–Definition Video, 1993, pp. 293–302.

Sang–Shin Lee et al., Variable Optical Attenuator Based on a Cutoff Modulator with Tapered Waveguides in Polymers, J. Lightwave Tech., vol. 17, No. 12 (Dec. 1999).

* cited by examiner

Lateral difference of effective refractive index

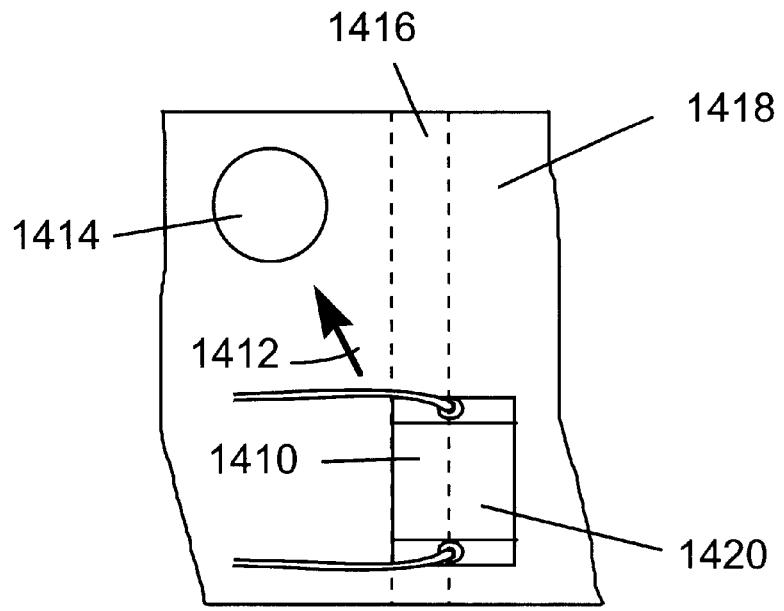
Fig. 14
Fig. 15
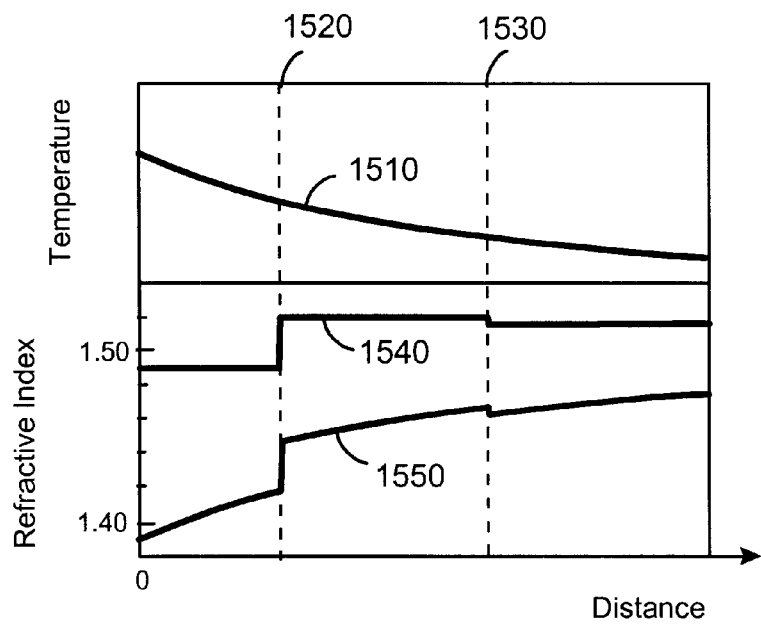

ANTI-WAVEGUIDE ROUTING STRUCTURE

This invention was made with Government support under Contract No. DAS60-96-C-0149 awarded by the Department of Defense. The Government has certain rights in the invention.

BACKGROUND OF THE INVENTION

1. Field of the Invention

The invention relates to integrated optics, more particularly, to switching and redirecting of light beams in optical waveguides. Manipulation of waveguide modes, which are light beams inside integrated optical devices, is a powerful capability that has useful applications primarily but not exclusively in displays and telecommunications, such as distribution of light in flat panel displays, re-routing of Wavelength-Division Multiplexed communications channels, and other integrated optics switching tasks.

REFERENCES

The following documents are incorporated herein by reference:
1) U.S. Pat. No. 5,544,268, August 1996, Bischel el al, "Display panel with electrically controlled waveguide-routing"
2) U.S. Pat. No. 3,801,185, April 1974, Ramaswamy et al, "Switch for thin-film optics"
3) U.S. Pat. No. 5,009,483, April 1991, and U.S. Pat. No. 5,106,181, April 1992, Rockwell III, "Optical waveguide display system"
4) J. Viitanen and J. Lekkala, "Fiber optic liquid crystal displays", SPIE Vol. 1976, *High Definition Video*, pg. 293–302 (1993)
5) U.S. Pat. No. 5,045,847, September 1991, Tarui et al, "Flat display panel"
6) R. Akkari et al., "Thermo-optic mode extinction modulation in polymeric waveguide structures", Journ. Non-Cryst. Solids, 187, pg. 494–497 (1995) p07) U.S. Pat. No. 4,648,687, Yoshida.

DESCRIPTION OF RELATED ART

Whereas in conventional optics, light beams are switched and manipulated by placing discrete optical elements such as mirrors, lenses, prisms, and etalons in their path, in integrated optics these functions are performed much more compactly, inside solid material structures that contain both optical waveguides and the means for manipulating the light beams traveling therein. The term "light" as used herein denotes "electromagnetic energy" and "optical energy" or "optical power" in general without restriction to visible wavelengths. It is known in the art as a basic principle that refractive index differences and gradients are key to guiding of light waves as well as to their manipulation, in solid materials. An optical waveguide, well known in the art, is an elongated region of material with a higher index of refraction called a core, typically surrounded by material with a lower index of refraction called a cladding, both materials being optically transparent to a greater or lesser degree. The core is laterally narrow but elongated along the desired path of light travel. Light traveling within such a structure becomes concentrated or confined to the higher index region, in a spatial intensity distribution that is called an optical waveguide mode. It is understood in the art that, as a guided light beam encounters different magnitudes of the refractive index arranged in different geometric shapes in the material, its mode shape changes in spatial extent, local intensity, and direction of travel accordingly. In known devices the electro-optic effect with electrical actuation, and the thermo-optic effect with actuation by an electrical heater element or by heating due to optical absorption of light emitting diode or diode laser light of suitable wavelength, have been employed to produce refractive index changes in response to an applied control signal.

Several techniques are known and have been used in the prior art of integrated optics for switching and redirecting light beams in optical waveguides.

Waveguide switches called TIR (Total Internal Reflection) or PIR (Partial Internal Reflection) switches, for routing of light beams to illuminate pixels in a display, are described in Bischel U.S. Pat. No. 5,544,268. The switches are based on electro-optically, thermo-optically, acousto-optically or magneto-optically creating a lower refractive index discontinuity situated at an angle to the waveguide direction so as to cause total internal reflection or partial internal reflection of the guided beam through a significant angle, upon application of a voltage or heat.

Waveguide switches variously called cut-off modulators, mode-extinction modulators, or cut-off switches, are described in other references. These devices are based on decreasing the refractive index difference between core and cladding of a section of optical waveguide below a value required for local confinement and guiding of light, at the wavelengths of interest in an application, by means of the electro-optic, thermo-optic or acousto-optic effect. If the refractive index difference is decreased below this value, all wavelengths become unguided (guiding becomes "cut off"), as the material is then substantially uniform with no local confinement of light. In terms of electromagnetic field theory, guided wave propagation is cut off and the light beam spreads out by diffraction, at a rate determined by the guided beam diameter entering the cut-off region, smaller modes generally diverging faster.

Most of the prior art switches and modulators suffer from several shortcomings including high drive power requirement, large size on an integrated optics chip, and inability to control the angle at which light is coupled out in the waveguide cut-off state. The present invention overcomes these problems by employing a different type of refractive index change, thereby providing a much smaller and more efficiently actuated device with more control over the out-coupling angle.

SUMMARY OF THE INVENTION

The invention provides an anti-waveguide routing structure, also called a waveguide switch or mode manipulator, that is a section of an otherwise permanent optical waveguide with a controllable refractive index change which exceeds that required to merely suppress waveguiding, thereby forcing a sharp redirection of the light beam from its original direction into selected transverse directions.

According to the invention, roughly described, an optical switch has a first state and a second state. In the first state, a structure in the switch confines one or more optical modes to propagate along a first, unswitched path. The switch is switched into the second state by reducing the refractive index along the first path, or alternatively increasing the refractive index of a region of the switch outside but adjacent to the first path, until the index within the first path is lower, preferably substantially lower, than that of the adjacent region. This creates an anti-waveguiding section in which light is forced to diverge from the unswitched path within a short distance, and into a desired transverse direction, by a combination of diffraction, owing to removal of waveguiding confinement; and refraction, owing to bending of the wavefront toward a higher-index region, and in some embodiments reflection from a high-low index boundary surface. The refractive index change is produced by known means such as the thermo-optic effect, the electro-optic effect, or other suitable effect such as magneto-optic or acousto-optic, together with its associated actuation means known in the art such as a thin-film electrically powered element for heating, or heating provision by a light beam, or electrodes for applying an electric field.

Particular selected transverse directions of weak confinement lead to planar, asymmetrical planar, and vertical versions of the anti-waveguide routing structure. The planar version has weak confinement laterally in the horizontal plane, equally on both sides of the confinement region, and upon actuation, light is forced out of the confinement region into two beams that are deflected symmetrically in lateral directions while remaining vertically confined. The asymmetrical planar version may have weak confinement only on one lateral side of the confinement region, and upon actuation, light from the confinement region is forced preferentially into a second path in the horizontal plane, while remaining vertically confined. Asymmetrical planar operation can also be realized in a structure with horizontally symmetrical weak confinement but an asymmetrically positioned actuation means such that, upon actuation, an anti-waveguide region is created primarily to one side of the center line of the waveguide. A vertical embodiment has weak confinement at a lower cladding layer located on the opposite side of the core from the actuation means, but stronger confinement in the other transverse directions, such that upon actuation, light from the confinement region is forced into a second path that diverges away from the actuation means, and generally in the downward direction.

BRIEF DESCRIPTION OF THE DRAWINGS

The invention will be better understood upon reference to the following detailed description in connection with the accompanying drawings, in which:

FIG. 14 is a plan view of an asymmetrical embodiment of the invention, including a target structure.

FIG. 15 is a chart showing variation of the temperature and the refractive index in the vertical direction through a vertical embodiment of the invention.

DETAILED DESCRIPTION

Figure 1:
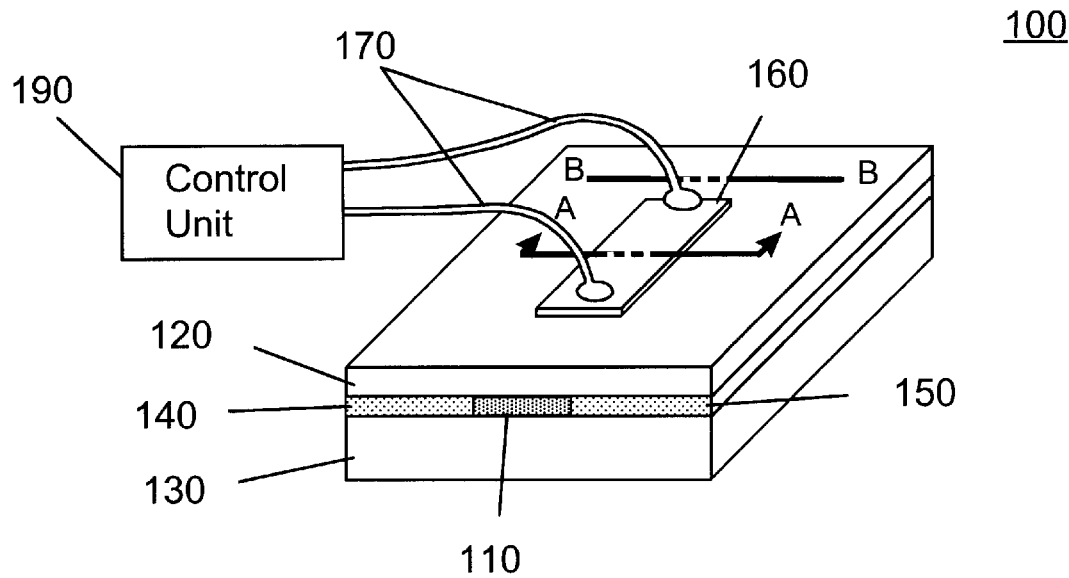
FIG. 1 is a symbolic perspective view of an anti-waveguide routing structure incorporating features of the invention.
Figure 2:
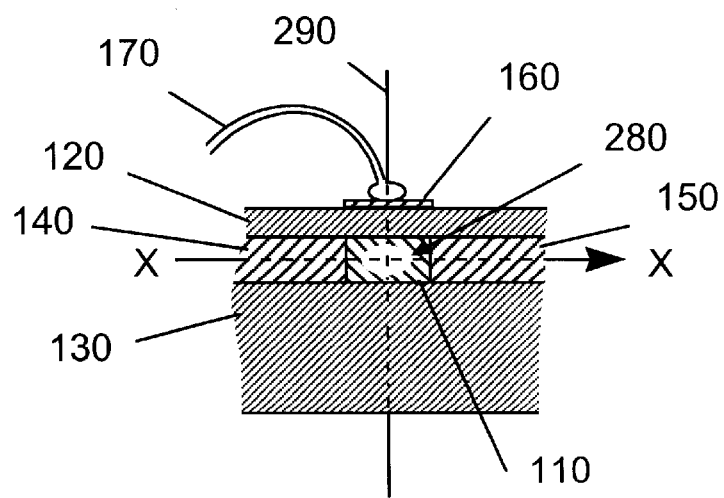
FIG. 2 is a cross-sectional view taken along line A–A in FIG. 1.

Referring to FIG. 1 and to a cross-sectional view FIG. 2 taken along the line A—A, there is shown an anti-waveguide routing structure 100 comprising a core 110, an upper cladding layer 120, a lower cladding layer 130, side cladding layers 140 and 150, an applicator 160 that is situated on the upper cladding layer 120 directly above a section of the core 110, and electrical connections 170 to a control unit 190. Control unit 190 is only symbolic, and could in various embodiments be made up of one or more sub-units spread over a small or large area, and can be implemented in software, hardware, or a combination of both. The control unit 190 is intended to include both the drive electronics and any control intelligence that might be required for a particular application. The materials of construction of the structure 100 are such that in the normal condition, that is, without activation of the applicator, the refractive index of the core is larger than that of the cladding layers, and the parts 110, 120, 130, 140, and 150 comprise an optical channel waveguide according to known art, where propagation of light is substantially confined to the core, in a normal waveguide mode, as indicated generally by 280. The materials have the further properties that, in the normal condition, the refractive indices of the upper and lower cladding layers 120 and 130 are significantly smaller than the refractive index of the core 110, thereby providing strong confinement vertically according to known art, and the refractive indices of the two side cladding layers 140 and 150 are equal to each other and only a little smaller than the refractive index of the core, thereby providing weak lateral confinement of light in a normal waveguide mode. The effect of strong vertical and weak lateral confinement is to limit the redirection of light upon actuation to the horizontal plane while keeping light confined in the vertical direction, and therefore a device with such further properties is herein called a planar anti-waveguide routing structure.

The applicator 160 is shown to be a thin-film heater that is a resistive element activated by an electric current connected through wires 170 from control unit 190. The material of the core 110 has further thermo-optic properties known in the art whereby a change in temperature (due to the applied heat) produces a change of refractive index in the material depending on the local temperature. The amount of change is expressed by the thermo-optic coefficient herein termed dn/dT. The core material is chosen to have a large negative dn/dT, such as provided by the polymers PMMA or polyurethane, so that a higher-temperature portion of the core nearer to applicator 160 when activated will have a substantially smaller refractive index than a lower-temperature part situated farther away from the applicator. The material of the cladding regions on the other hand may be, but do not have to be, chosen to be less affected by temperature or alternatively, affected in the opposite direction. However, the top cladding material is chosen preferably to have a large refractive index difference with respect to the core layer, to minimize the insertion loss from the applicator. The lower cladding is less critical and is chosen to have a refractive index lower than the core layer. Examples of suitable materials include glasses (for example Corning 1734), polyacrylates (for example Gelest UMS-182), urethanes, and polyimids. Particular materials are mentioned here for illustrative purposes and it should be apparent to those skilled in the art that other materials may also be found suitable for the functions described.

Activation of the applicator thus produces a spatially varying change of refractive index, superimposed on an otherwise permanent optical waveguide. Upon activation, the refractive index of at least a portion of the core 110 becomes substantially reduced relative to the refractive index of a part of the side cladding regions 140 and 150 adjacent to the core, but not relative to the upper and lower cladding layers. The resulting index profile is spatially continuous, although not necessarily uniform. As used herein, one region is considered "adjacent" to another region if it is within such a distance as to influence the propagation of the optical mode in an otherwise permanent waveguide, which generally implies within a few evanescent decay lengths of the mode. The effect of the decreased refractive index of at least a portion of the core, relative to the refractive index of the regions laterally outside and adjacent to the core, is to force light out of the unswitched waveguide within a short distance, and into two laterally diverging paths in the horizontal plane, by the sum of two well-known processes of optics: diffraction and refraction. Light spreads by diffraction, owing to removal of guided wave confinement laterally; and deflects by refraction, owing to bending of the wavefront away from the smaller refractive index region created in the core, and toward the now relatively larger-refractive index cladding laterally outside the core region. As used herein, an "anti-waveguide" is a structure in which the optical index profile is such as to force optical energy to diverge from a normal propagation path both by diffraction and by refraction toward a higher index adjacent cladding region.

Figure 4:
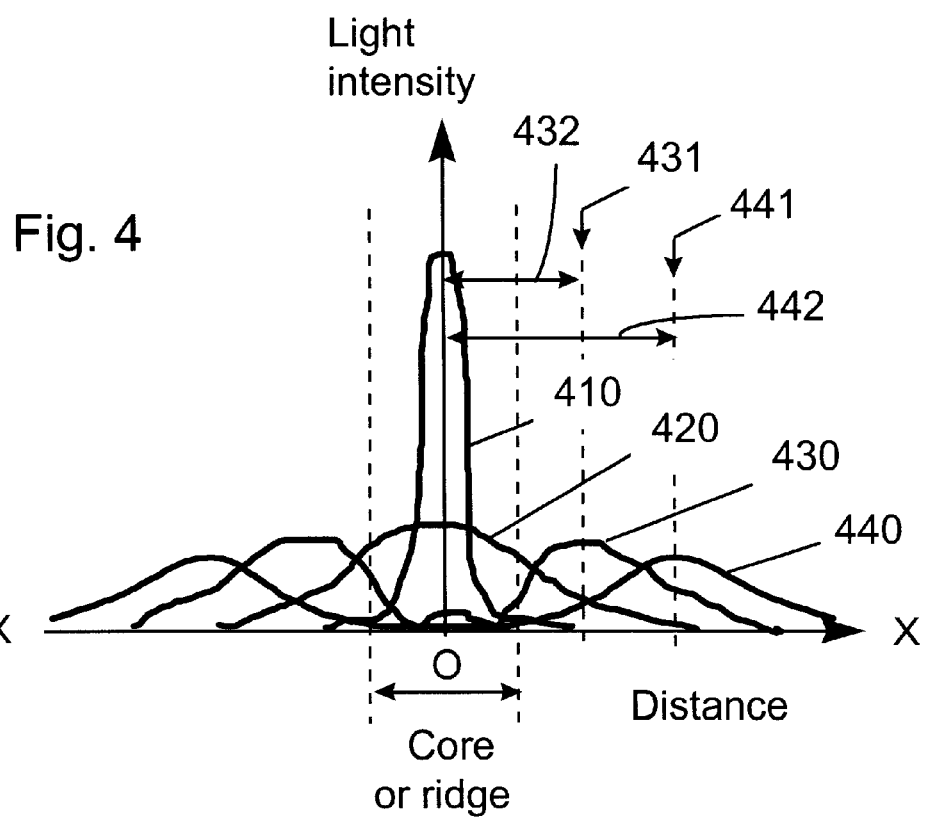
FIG. 4 shows lateral light intensity profiles for different degrees of actuation, during operation.

The operation of an anti-waveguide routing structure is made clearer with reference to FIG. 4, which depicts lateral light intensity profiles of an optical mode resulting from a planar anti-waveguide routing structure, under different degrees of actuation. The profiles schematically represent the variation of light intensity as a function of distance from a vertical line of symmetry 290, measured in the lateral direction along a horizontal line X—X passing through the core (FIG. 2), in a cross-sectional plane cutting a line B—B identified in FIG. 1, which is located at some distance downstream of the applicator in the unswitched waveguide propagation direction. The degree of actuation affects the magnitude of the lateral refractive index difference between the core and the side cladding adjacent to the core, which in turn affects the strength of waveguiding or anti-waveguiding of light in the structure. Curve 410 is for the unswitched condition, that is, without activation of the applicator, in which the refractive index of the core is larger than that of the side cladding adjacent to the core, resulting in an optical waveguide mode that is confined within the core, with little light intensity outside the same. Curve 420 is for a small degree of actuation, corresponding to a reduction of the refractive index of the core to be approximately equal to that of the side cladding adjacent to the core, and resulting in a wider mode with light spreading out beyond the core. Here the waveguide is near nominal effective cut-off, where the peak intensity of light is still highest in the original direction of propagation, but the magnitude is decreasing with longitudinal distance because of spreading by diffraction. Curve 430 is for a medium degree of actuation, corresponding to a reduction of the refractive index of the core significantly below that of the side cladding adjacent to the core, and resulting in a mode with two symmetrical lobes or peaks 431, propagating at an angle to the original direction, with little light intensity remaining in the region of the prior waveguide mode. Curve 440 is for a large degree of actuation, corresponding to a further reduction of the refractive index of the core well below that of the side cladding adjacent to the core, and resulting in a mode profile 440 with peaks 441 propagating at a still larger angle of deviation from the original direction, as indicated by the distances 432 for medium actuation and 442 for strong actuation. With increasing degree of actuation, the deviation angle increases, and the mode peaks move farther out laterally, at a given longitudinal position along the waveguide.

It is apparent from the foregoing description that, at cross-sections taken further downstream from the applicator, the two symmetrical peaks of an optical mode corresponding to a given actuation strength within the anti-waveguiding range will be situated at further distances laterally from the line of symmetry, because of deflection at an angle. On the other hand, the single peak of an optical mode corresponding to weaker actuation, before and up to nominal effective cut-off, will still appear centered on the line of symmetry but it will be of smaller amplitude and laterally wider than the guided mode profile because of diffraction.

Figure 3:
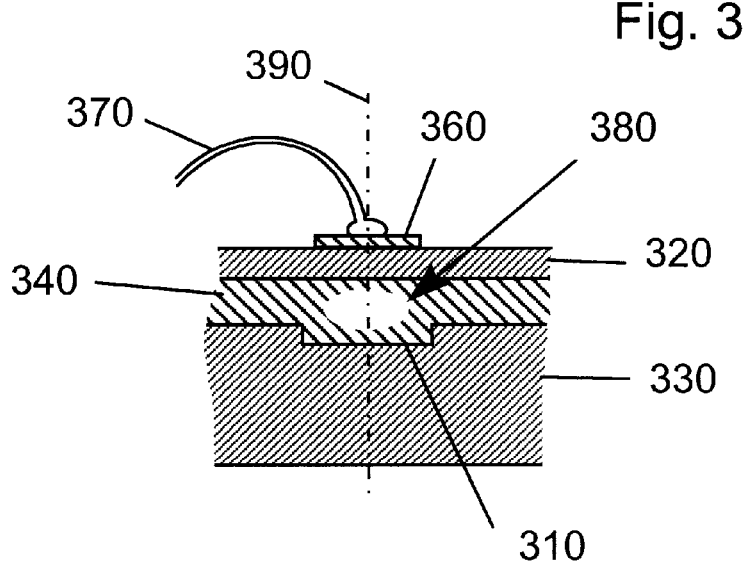
FIG. 3 is a cross-sectional view of a ridge waveguide embodiment of the invention.

An alternate embodiment of a planar anti-waveguide routing structure is shown in cross-sectional view in FIG. 3, that is a ridge waveguide structure comprising an extensive slab core layer 340 with a ridge 310 that is a thicker section of the same material, to provide lateral confinement in place of the side cladding layers 140, 150, and discrete core region 110. It is known in the art that light is laterally confined to the thicker core region at the ridge in such a structure, as indicated by 380. Lateral confinement is understood in terms of an "effective" refractive index per vertical slice through the structure, as described for example in Marcuse, D., *Theory of Dielectric Optical Waveguides*, Second Edition, Academic Press, Inc., San Diego, 1991, incorporated by reference herein. The region immediately laterally outside the ridge has a smaller effective refractive index than the ridge, owing to more smaller-index cladding material 330 and less larger-index core 340 material, per vertical slice.

It is apparent to those skilled in the art that the description of operation of an anti-waveguide routing structure with reference to a planar embodiment shown in FIG. 2 will apply equally to a planar, ridge waveguide embodiment shown in FIG. 3 with substitution of the terms "ridge region" for "core" and "region immediately laterally outside the ridge" for "side cladding adjacent to the core".

It should now be further apparent that the present invention employs a refractive index change that is different in magnitude and geometry from that known in prior art, to enable a new type of light deflector or redirector using refraction in addition to diffraction, thereby providing a greatly improved functionality. Some of the advantages of the invention over prior art are: higher efficiency in terms of required activating power to achieve a given extinction ratio in the active or on-state; lower insertion loss in the off-state of a waveguide switch upon aging; and less sensitivity to misalignment in fabrication.

The anti-waveguide routing structure of this invention may require less electrical power to achieve a given efficiency of redirection of light than a TIR switch, because a thermo-optic applicator in the structure will occupy less area than in the switch. Both devices can use the thermo-optic effect to create a region of lower refractive index and can require approximately the same degree of actuation in terms of the refractive index change and heating power density, expressed in units such as Watts per square centimeter. TIR switches in prior art typically operate with a thermo-optic applicator that is a heater placed at an angle of a few degrees with respect to the waveguide, crossing over the waveguide and extending approximately 10–20 $\mu$m in the perpendicular direction on either side of the waveguide axis, in order to ensure that the entire optical field is deflected during switch activation. Waveguides with larger mode widths may require the heater to extend even more than 20 $\mu$m on each side of the waveguide. The alternative use of a shorter heater situated at a larger angle to the waveguide would not significantly reduce the power requirement of a TIR switch, because increasing the intersection angle between the applicator and waveguide increases the refractive index change required to achieve a given reflection efficiency and therefore once again increases the power density required at the heater. The required power density increase offsets the heater area decrease owing to a shorter length, resulting in a higher product of power density and heater area. In the embodiments of the present invention described herein, on the other hand, the applicator is significantly narrower, not extending substantially beyond the core as indicated in FIG. 2, and thus has less area and consequently requires less power. The applicator here acts to reduce the refractive index in the core at the central part of the unswitched waveguide mode, and thereby creates anti-waveguiding without the need to act across the entire mode profile including the evanescent tail regions.

An anti-waveguide routing structure may possess a better extinction ratio compared to cut-off modulators. The extinction ratio is the light intensity measured at the output of a routing structure or modulator when actuated, divided by the light intensity measured at the output when it is in an off-state. A large extinction ratio is desirable for a switch. The output of such a device may be situated at the output facet of an unswitched waveguide section downstream of an applicator. As illustrated in FIG. 4, there is a significant qualitative difference between an anti-waveguiding optical mode shape, obtained with sufficiently large actuation, and that for mere nominal effective cut-off obtained with a small degree of actuation as described in prior art. The deflected lobes of an anti-waveguide routing structure have minimal intensity in the unswitched waveguide direction, while the mode peak of a cut-off modulator on the other hand is still centered in the unswitched waveguide direction and decreased in amplitude only by expansion of a single mode by diffraction. Consequently in the anti-waveguiding structures described herein there is much less light propagating in the unswitched direction at the output facet when activated, than in a conventional cut-off modulator, yielding a larger extinction ratio than in conventional devices.

Polymer thermo-optic devices are sometimes subject to drift of optical properties, such as a permanent refractive index change, caused by repeated temperature cycling in normal operation. The magnitude of such change will be greatest in close proximity to the heater. In a TIR switch, any such change will occur along a shallow-angle TIR/PIR interface and cause permanent light deflection from the waveguide, resulting in an insertion loss in the off-state. However, in an anti-waveguide routing structure the boundary of any such permanent refractive index change can be made to be substantially perpendicular to the waveguide direction and thus results in significantly less Fresnel reflection than the glancing angle of incidence in the TIR structure and consequently smaller insertion loss. For example, for a permanent refractive index change of 0.0005, a 1.5-degree TIR switch acquires a 0.2 dB insertion loss, while an anti-waveguide routing structure develops an insertion loss of 0.02 dB, which is an order of magnitude smaller. Low insertion loss is especially desirable in applications where an incoming light beam must propagate through many waveguide switches or routing structures.

For use in display applications the anti-waveguide routing structure as described herein is preferable over a TIR switch, as alignment of the applicator is much less critical than in a TIR switch. In a TIR switch, a misaligned applicator can produce displacement of the effective pixel location. In the devices described herein, on the other hand, the principal effect of misalignment is only a reduced efficiency in terms of the electrical activation power required, without change of deflection angle or pixel location.

A first planar embodiment of the invention is a thermo-optically actuated ridge waveguide structure, described with reference to FIG. 3, and further described here in greater detail. The fabrication of the embodiment is best explained also with reference to the flow diagram of FIG. 5, which shows an example of one of many fabrication methods that may be employed.

The structure may be fabricated on top of a substrate, not shown, which is preferably a glass wafer but may be any material of sufficient thickness to provide mechanical support for subsequently deposited layers, for example a metal, polymer, semiconductor, or glass such as Corning 1734. For applications requiring flexibility, a polymer substrate is preferred over rigid substrates. If no substrate is provided, a lower cladding layer 330 of appropriate thickness may act as the substrate.

Figure 5:
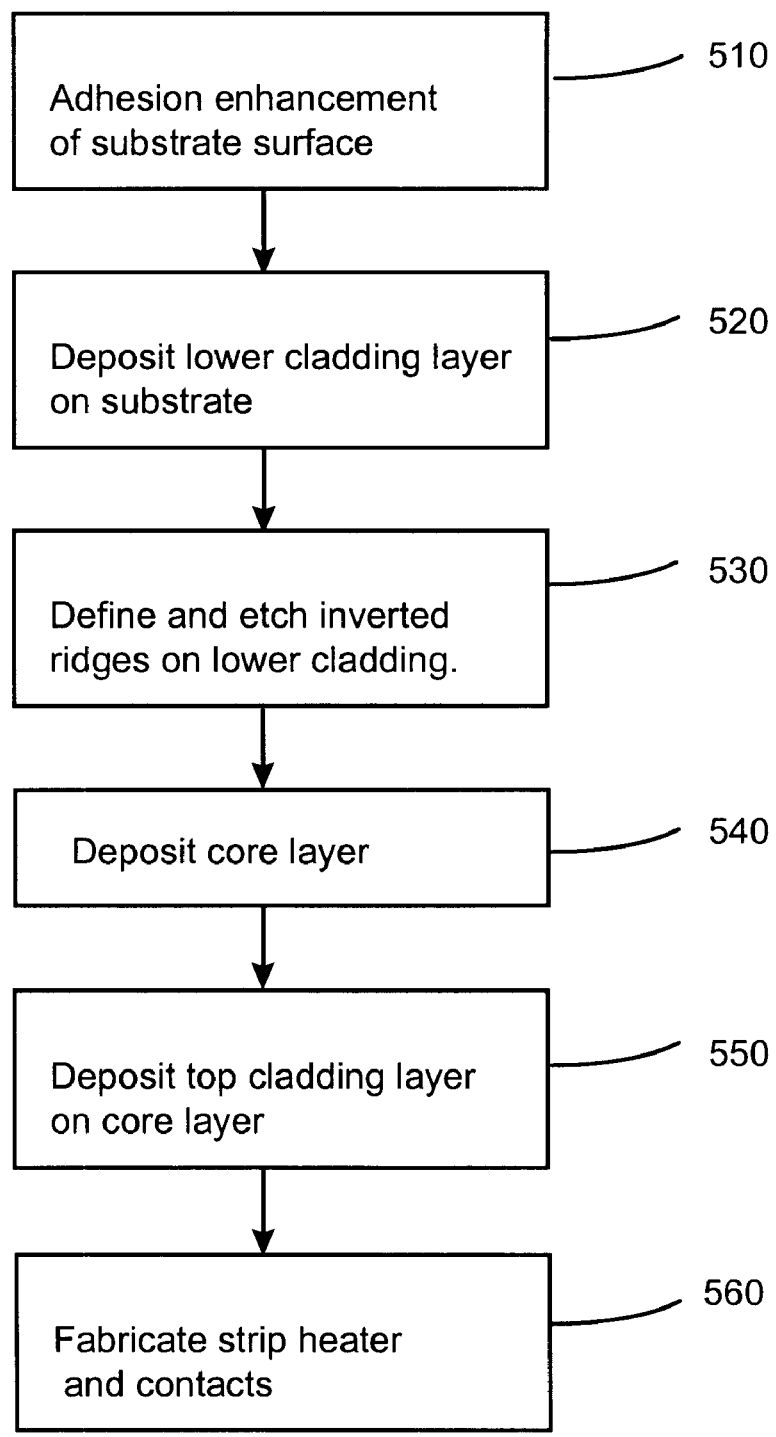
FIG. 5 is a flow chart describing a fabrication procedure for a ridge waveguide embodiment of a planar anti-waveguide routing structure.

In the first step 510 of the fabrication procedure shown in FIG. 5, a layer of material, is deposited on the substrate surface for the purpose of increasing adhesion of the cladding layer, which is preferably a polymer. The desired characteristics of such an adhesion layer are good adhesion and chemical compatibility with the materials on either side of it, without chemical reaction and change in properties over time. The adhesion layer is preferably Norland Optical Adhesive 68, deposited preferably by spinning which is well known in the art.

In the second step 520 of the fabrication procedure, an optically transparent lower cladding layer 330 is deposited on the layer of material (the adhesion layer), to a preferred thickness of 5.0 $\mu$m, preferably by spinning. The lower cladding layer 330 is preferably a polyacrylate copolymer (for example Gelest UMS-992), with refractive index of 1.49 and a small dn/dT of approximately $-1.8\times10^{-4}/°$ C. A standard polymer layer deposition procedure is employed, comprising viscosity adjustment prior to deposition, spinning, and curing with ultraviolet light. In the polymer procedure, prior to deposition, approximately 0.5% of a photo-initiator (for example Daracor 1178) is added to the cladding material, along with a suitable quantity of solvent to adjust viscosity, to enable the layer to be deposited at a reasonable spin speed. Different viscosity adjusting solvents are appropriate for different polymers, and for the lower cladding layer it is preferably PGMEA. After spinning, the layer is cured under nitrogen using ultraviolet light in the wavelength range of 250 nm to 450 nm, to promote crosslinking of the polymer chains and create a chemically and mechanically robust layer. Suitable cure times are approximately 1 minute with 100 W lamp power at 250 nm wavelength, or 5 minutes with 100 W at 400 nm. Alternatively another optical material may be used for the lower cladding layer, such as another type of polymer, sol-gel aero-gel, liquid crystal, semiconductor, silica glass, or ceramic; and alternatively deposited by another method known in the art, such as meniscus, extrusion, spray, dip, evaporation coating, or sputtering.

In the third step 530, inverted ridges 310 are etched into the lower cladding layer 330, to a preferred depth of 0.0650 µm. The ridges are defined using standard photolithographic techniques, by depositing a positive photoresist layer on the lower cladding layer, exposing only the ridges through a mask, developing and removing the exposed photoresist in the ridge areas, and etching to create the ridges preferably by means of reactive ion etching (RIE), known in the art, while the rest of the lower cladding layer surface remains protected by photoresist. The mask defining the waveguide may be aligned with respect to marks lithographically patterned on the substrate, to provide registration between the waveguide and subsequent patterned features. For etching the preferred lower cladding material, a polyacrylate copolymer, RIE in a trifluoromethane ($CHF_3$) gas plasma is suitable, with an etch time of a few minutes at a power of approximately 25–50W. Alternatively a chemical etching process known in the art may be employed in place of RIE. The remaining photoresist is then exposed and removed. Design calculations to determine the preferred depth and width of the ridges are known in the art and described, for example, in Nishihara et al., *Optical Integrated Circuits*, McGraw Hill, 1989, incorporated by reference herein.

In the fourth step 540, a core layer 340 having a refractive index greater than both cladding layers 320 and 330, and having a large negative dn/dT, is deposited on top of the now patterned lower cladding layer 330, to a preferred thickness of 1.2 µm. The core layer is preferably Norland Optical Adhesive 68, with refractive index of 1.52, and dn/dT of approximately $-3.3 \times 10^{-4}/°$ C., preferably deposited using the standard polymer layer deposition procedure, with the preferred solvent cyclohexanone. Alternatively the core layer may be, for example, PMMA, a thermoplastic or a crosslinked material with large negative dn/dT, and alternatively deposited by another one of the many methods known in the art. The top surface of the core layer is substantially planar, owing to the small depth of the ridge relative to the core layer thickness. For a given ridge depth, that thickness is chosen according to known art to provide both lateral confinement of the optical mode and a single propagating waveguide mode. For example, if the difference of effective refractive index between the ridge region and the region immediately laterally outside the ridge, herein referred to as δn, is approximately 0.003 or less and the width of the ridge is approximately 6.0 µm or less, the waveguide will only support a single transverse mode, also termed the lowest-order mode, over a 100 nm range of wavelengths. For larger values of δn and/or wider ridges, the number of supported optical modes increases.

In the fifth step 550, an upper cladding layer 320, preferably, a polyacrylate copolymer (such as Gelest UMS-182), with refractive index of 1.42 and a dn/dT of approximately $-4.0 \times 10^{-4}/°$ C., is deposited over the core layer preferably to a thickness of 1.4 µm, preferably using the standard polymer layer deposition procedure, with the preferred solvent cyclohexanone. This thickness provides a good trade-off between absorption loss of the optical mode due to the applicator metal on the top surface and degree of actuation per unit activating power, as both are decreasing functions of upper cladding layer thickness. The preferred thickness can be further minimized if δn between the upper cladding material and the core material is large.

Fabrication of an applicator is the sixth step 560 of the fabrication procedure. A thermo-optic applicator 360 shown in FIG. 3 is schematically depicted in greater detail in FIG. 6. The applicator is preferably a thin-film heater that is a resistive element 660 activated by an electric current supplied through electrical contact stripes 662 and wires 670, attached to control unit 190 (FIG. 1). The applicator operates by converting electrical energy into heat, which is conducted to an adjacent region of the structure, raising the temperature, and thereby causing a change in the refractive index, by the thermo-optic effect. To fabricate the thin-film heater 660, a layer of preferably nichrome thin-film resistor material, well known in the art, is deposited on top of the upper cladding layer 620 by a known technique preferably D.C. sputtering, to a preferred thickness of 0.1 µm. Good adhesion of the thin-film heater material to the surface of the upper cladding layer is essential, and that is ensured by employment of RF bias during the preferred deposition process. To fabricate electrical contact stripes 662 that overlap the ends of the resistor material and provide a preferred surface for wire bonds 670, a layer of electrical contact metal, preferably gold, is deposited on top of the thin-film heater layer in the same pumpdown, also to a preferred thickness of 0.1 µm. Electron beam evaporation may alternatively be employed.

Figure 6:
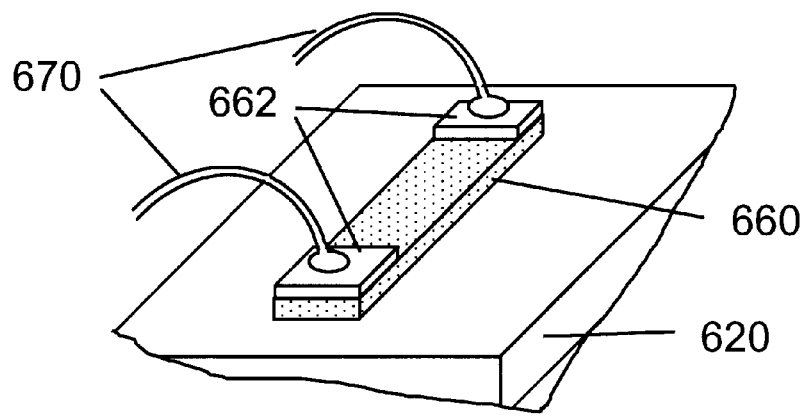
FIG. 6 is a symbolic perspective view of a thermo-optic applicator.

The shape of the heater is defined preferably by a standard wet etch technique known in the art, whereby photoresist is applied on the surface of the sputtered metal layers, then exposed through a first applicator mask, and developed to leave a photoresist layer of the desired shape covering the heater 660 and contacts 662 as shown schematically in FIG. 6, for protection during etching. The mask is aligned relative to alignment marks defined previously lithographically on the substrate, or alternatively, made during the inverted ridge etching step 530, so as to place the applicator directly over a section of the otherwise permanent waveguide and preferably laterally centered on the line of symmetry 390 as shown in FIG. 3. The structure with photoresist is then etched using a standard commercial gold etch, followed by a standard commercial nichrome etch. Photoresist is then applied again on the surface, exposed through a second applicator mask, and developed to expose the nichrome layer 660 between the contact stripes 662. Gold is then etched off the exposed area with a standard commercial gold etch, thereby producing a thin-film heater with gold contact pads at each end.

An alternative method for fabricating the thin-film heater 660 is as follows. First the top surface of the upper cladding layer is laminated with a laser ablation material (LAM). The patterns desired for the heaters 660 are then laser ablated into the LAM to expose the upper cladding material only in the regions desired for heaters 660. The thin film resistor metal is then deposited onto the entire surface of the device, including both the un-ablated and ablated regions. The LAM layer is then peeled off, together with the metal superposing it. Because the metal deposition step does not completely coat the vertical sidewalls opened by the laser ablation step, the metal patterns on the surface of the upper cladding material will remain when the LAM layer is peeled off. The electrical contact stripes 662 are then added in the manner previously described. This alternative method avoids photolithography steps and allows patterning to be performed without using solvents or chemicals. The technique can be used to apply many different kinds of patterned layers to the top surface of almost any device on which a laser ablation material can be formed.

The preferred length of the nichrome thin-film heater, that is the applicator, is in the range of 100 µm to 500 µm between the contact stripes, in the longitudinal direction of the unswitched waveguide, and its preferred width in the lateral direction is substantially the same as the width of the ridge 310. The applicator may alternatively be longer or shorter. However, beyond some particular length, further increase of heater length does not improve switch efficiency. Depending on the angle of deflection when actuated, no light remains in the ridge region beyond some distance, and a portion of an applicator extending beyond that does not contribute to further deflection. Thus an applicator longer than approximately 500 µm will take up too much area and reduce the switch density in integrated applications, and may require excessive electrical power for operation. An applicator that is too short, on the other hand, will require more activation power per unit area to produce a given deflection of light and may burn or otherwise damage the polymer materials.

Wire bonds 670 may then be made by standard techniques according to known art in the field of micro-electronics. Gold is the preferred material for the electrical contact stripes, but other electrically conductive materials may alternatively be used such as aluminum, titanium, chromium, conductive paint, epoxy, semiconductor, other such conductive materials, or optically transparent materials such as oxides of indium and tin, and liquid conductors such as salt solutions. Alternate methods of making contact to the heater may be employed, such as by probes directly on the contact pads, or wire connections to bonding pads at the outer edges of a sample by way of a lithographically patterned conductor network, or connections through via holes made in the core and cladding layers to conductors deposited and patterned on the substrate.

The applicator may additionally have other, special-purpose layers of material, not shown, between the thin-film heater and the surface of the upper cladding layer, that are deposited and defined according to known art as described with reference to the heater. These special-purpose layers may serve functions such as increasing the adhesion of the thin-film heater material to the surface of the upper cladding layer; reducing the optical loss which occurs when a portion of the guided wave mode extends to a metallic region, such as an electrical contact stripe or thin-film heater; and reducing the tendency to electrical breakdown.

Chemical compatibility is a general requirement in the choice of materials used in fabrication of the anti-waveguide routing structure, in order to ensure stability of the structure over time.

The thermo-optically actuated planar anti-waveguide routing structure of FIG. 3 operates as follows. In the off-state, when no electrical current is supplied to the applicator 360, light propagating in the otherwise permanent waveguide passes through the section under the applicator with minimal disturbance, and is confined laterally by an effective refractive index difference, δn, between the ridge region and the region immediately laterally outside the ridge. The value of δn is preferably 0.003 or less, with the ridge or core region having a higher effective refractive index than the region immediately laterally outside the ridge, for a normal waveguide mode.

When the applicator is activated, that is, electrical current is supplied to the applicator from control unit 190, the nichrome thin-film resistor heats up and raises the temperature of the solid materials adjacent to, and physically near it. The applicator 360 is shown in FIG. 3 to have limited width in the lateral direction, and it preferably has substantially the same width as the ridge 310. According to well-known principles described for example in Carslaw and Jaeger, *Conduction of Heat in Solids,* incorporated by reference herein, a temperature gradient develops, such that the temperature is high nearest to the applicator, decreases farther away, and eventually, far enough away from the actuator, reaches a normal value that is nearly the temperature in the off-state. Owing to the temperature gradient, the entire core region beneath the electrode (as shown, the ridge region of the core) which is closer to the applicator, heats to a higher temperature than the region immediately laterally outside the ridge, which is situated farther from the applicator.

Figure 7:
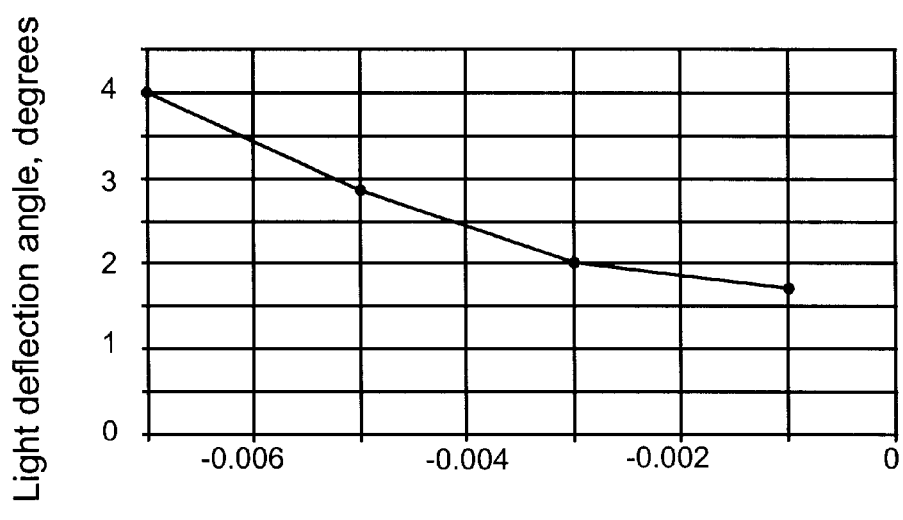
FIG. 7 is a chart showing variation of the deflection angle with strength of anti-waveguiding.

As a consequence of the thermo-optic effect, the refractive index of the portions of the materials that are at a higher temperature acquire a larger index change relative to values in the off-state at a normal temperature. The amount and direction of change depends on the thermo-optic coefficients of the materials. For most polymers the value of dn/dT is negative and between $-0.8 \times 10^{-4}/°$ C. and $-5.0 \times 10^{-4}/°$ C., and for many glasses it is between 0 and positive $10^{-6}/°$ C., but may also be negative. The core material has preferably a large negative value of dn/dT. The cladding layers are chosen to have refractive indices less than the core layer, and in particular, the difference in refractive index between the top cladding and the core is preferably large (approximately 0.1) to minimize the insertion loss from the applicator. The hotter ridge region of the core thus experiences a large decrease in refractive index and the less hot region immediately laterally outside the ridge, a smaller decrease, thereby creating an anti-waveguide structure in the heated portion of the otherwise permanent waveguide structure, with a reversed, negative value of δn. A smaller value of dn/dT for the lower cladding layer further limits the decrease in refractive index produced in the region immediately laterally outside the ridge, where the layer is thicker, and thus helps to create a given negative value of δn with the least degree of actuation. When the applicator is activated to a sufficient degree as described with reference to FIG. 4, light propagating in the waveguide toward the applicator becomes redirected, as it enters in and travels in the anti-waveguide section formed under the applicator, into two paths on either side of the ridge, while remaining substantially vertically confined in the plane of the core layer 340. The degree of actuation affects the value of δn, and that determines the strength of anti-waveguiding produced in the structure in terms of the sharpness or the angle of light deflection. The expected deflection angle of light in the preferred embodiment as a function of the lateral difference of effective refractive index, δn, is shown in FIG. 7, based on analysis of the waveguide structure by the beam propagation method known in the art, which method is described for example in the Marcuse reference incorporated above, at pp 306–318. With reference to FIG. 7, if the normal (unswitched) value of δn is 0.003, a change of −0.010 upon actuation may be required, in order to overcome normal confinement and produce light deflection at an angle of 4 degrees, for example, in the embodiment of this invention.

Vertical confinement is obtained in the preferred planar embodiment by having a large refractive index difference between the core and the cladding layers in the off-state, preferably 0.100 between core and upper cladding layer, and 0.030 between core and lower cladding layer, such that the structure remains vertically confining, that is, core larger than cladding, also while actuated to the maximum expected degree.

Note that whereas anti-waveguiding can be initiated by the specific methods described above, many variations are possible as well. All that is required is that in one state, a portion of the confinement region have a higher index of refraction than an outside region adjacent to the confinement region, by a difference that is sufficient to confine the optical mode in the direction of the outside region; and that in the second state a portion of the outside region adjacent to the confinement region now have an index of refraction that is higher than that of a portion of the confinement region adjacent to the outside region. In one embodiment, the switching from the first state to the second state can be accomplished by depressing the index of the confinement region without changing the index of the outside region, or by depressing the index of the confinement region while increasing the index of the outside region, or by depressing the index of both regions but doing so to a greater extent in the confinement region than in the outside region. The system can change the index in the confinement region to a different extent than in the outside region either through the use of two different materials in the two regions (e.g. a core material in the confinement region and a different cladding material in the outside region), or by using a single material in both regions (or different materials with similar coefficients of index change per unit of control signal applied) but applying the control signal preferentially in one region or the other. For example, a thermo-electrode applicator (heating element) can be formed to superpose the confinement region and not the outside region. As an alternative example, where the material of at least the outside region has a positive electro-optic coefficient, applicators (electrodes) opposing a common ground plane electrode can be formed superposing part of the outside region adjacent to the confinement region but not superposing the confinement region.

An asymmetrical planar embodiment of the invention has an asymmetrically positioned applicator 860, as shown in plan view in FIG. 8, but it is otherwise substantially similar to the planar embodiment described with reference to FIGS. 1 and 2. The materials are chosen such that the values of the thermo-optic, or alternatively electro-optic, coefficients of the core and side cladding layers are reasonably matched. The applicator 860 is on the top surface of an upper cladding layer generally above a core 810, which is shown in dashed lines. The applicator is shown to be wider than the core and aligned on one side with the core but overlapping some distance on the other side, over a side cladding region. The figure also shows a cross-hatched extension region 866, but this region is not necessary in this embodiment. Activation of the asymmetrically positioned applicator, by means of the thermo-optic or alternatively by other effects, creates an anti-waveguiding region primarily to one side of an otherwise permanent symmetrical waveguide structure, while the structure remains confining to light on the opposite side and also vertically. This may be understood with reference to the description given above of the operation the symmetrical planar embodiment of the invention. Upon actuation, owing to an asymmetrically positioned and wider applicator, the part of the right side cladding adjacent to the core, that is directly under a part of the applicator, is situated substantially the same distance from the applicator as the portion of the core 810 under the applicator, and therefore heats up substantially to the same degree. As the thermo-optic coefficient values of the core and side cladding layers are reasonably matched, the refractive index decrease is thus substantially the same in the regions, and that substantially preserves the prior value of the refractive index difference between core and right side cladding adjacent to the core, which also preserves the normal lateral confinement on the right side, in the evanescent tail region of the prior optical mode of the otherwise permanent ridge waveguide. On the left side, however, the refractive index difference between core and cladding, and the consequent strength of anti-waveguiding created, is substantially similar to the symmetrical case, described with reference to FIGS. 3, 4, 5, and 6. An asymmetrical strength of lateral confinement of light is thus produced, and light from the unswitched waveguided path indicated by an arrow 881 is accordingly forced preferentially to one side, into a second path in the horizontal plane indicated by an arrow 882, away from the applicator.

In order to simplify the description of the invention, as used herein, "directions of confinement" are limited to directions orthogonal to the normal (unswitched) propagation direction of an optical mode. Thus a planar optical waveguide confines an optical mode in both the upward and downward directions but not in either of the two opposite lateral directions. A waveguide formed with top, bottom, left and right side cladding materials, confines an optical mode in all directions orthogonal to the direction of mode propagation. Similarly, if confinement in a given direction is suppressed, such as by turning on the optical switch, then the direction to which optical energy escapes the confinement region is referred to herein as the "given direction," even though the centroid of the escaping optical energy follows a path that may diverge only slightly from the unswitched propagation direction of the mode. Referring to FIG. 8, therefore, confinement is maintained in the switched state in the rightward direction 890, but suppressed (actually more than suppressed) in the leftward direction 892.

Figure 8:
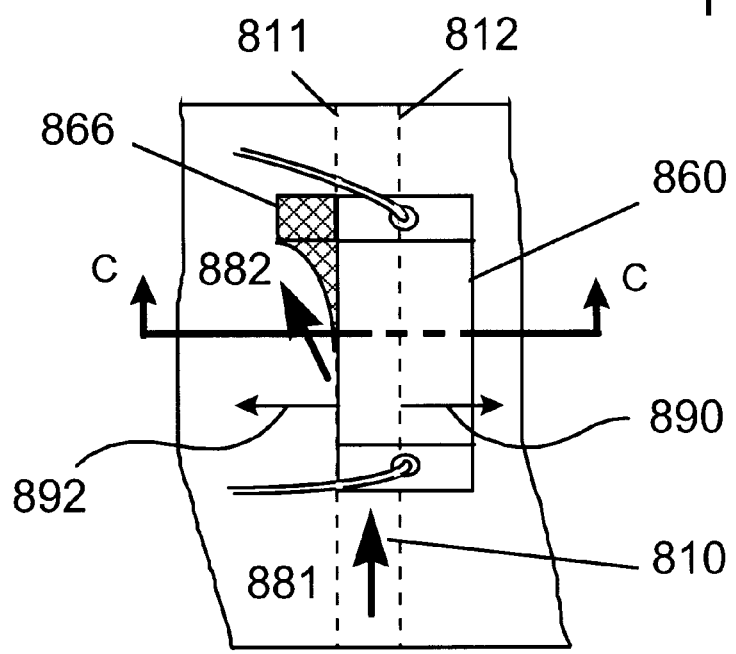
FIG. 8 is a plan view of an asymmetrical embodiment of the invention, showing an asymmetrically positioned applicator of non-uniform width.

An asymmetrically positioned applicator alternatively can have non-uniform width, such as a curved left side, as indicated by the cross-hatched extension 866 of the applicator 860 shown in FIG. 8. The effect of such a curved side as shown will be to cause a greater deflection of light to the left, upon actuation, as the deflected beam 882 continues to encounter the anti-waveguiding refractive index boundary between the core and cladding on the left side, for a greater distance than without the extension. The non-uniform width is shown as a curved shape but linear tapers and other non-uniform shapes may alternatively be employed. Note also that the input and output edges of the thermo-optic applicator 860 remains perpendicular to the direction 881 of light propagation along the unswitched path, to ensure minimal insertion loss.

Another alternate asymmetrical planar embodiment has a symmetrical applicator but asymmetrical confinement of light in the otherwise permanent waveguide structure, such that there is weak confinement laterally only on one side of the core and stronger confinement on the other side. Such asymmetrical confinement may be obtained by appropriate choice of the refractive indices of the side cladding layers 140 and 150, and the core 110, as shown and described with reference to FIGS. 1 and 2. For example, weaker confinement is obtained on the left side if the refractive index difference between 110 and 140 is 0.003 or less, and stronger confinement is obtained on the right side if the refractive index difference between 110 and 150 is 0.030, in the otherwise permanent waveguide structure. Alternatively the asymmetrical confinement may be realized in a ridge waveguide structure by asymmetrical thickness of a slab core layer laterally outside the ridge. Upon actuation, heating is produced symmetrically in the structure as described for the symmetrical embodiment, but the value of the consequent lateral negative difference of refractive index between the core and side cladding near the core is sufficient to create anti-waveguiding only in the horizontal plane on the weakly confined side, and not the opposite side, thus deflecting light from the prior waveguide mode, or first path, into a second path, toward the weakly confined side.

The asymmetrical planar structures can produce a single-lobed light deflection pattern, with an intensity profile substantially similar to one-half of the double-lobed profile shown for the symmetrical case in FIG. 4.

The terms "right" and "left" as used herein refer to opposite directions in a relative sense and may be interchanged, or rotated with respect to a fixed frame of reference, within the teaching of this invention.

Figure 9:
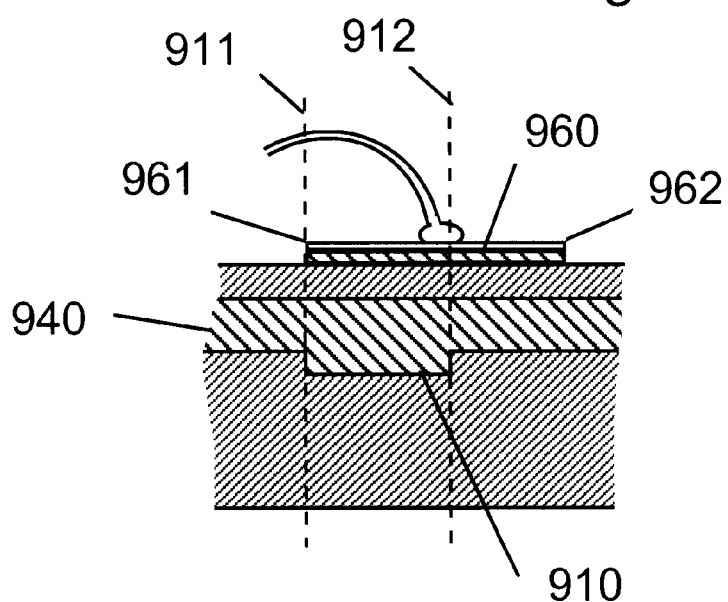
FIG. 9 is a cross-sectional view of an asymmetrical planar embodiment of the invention, taken along line C–C in FIG. 8.

The preferred asymmetrical planar embodiment is a ridge waveguide structure with asymmetrically positioned thermo-optic applicator. The preferred embodiment is described with reference to FIG. 8, with or without the extension portion 866, where the dashed lines 811 and 812 are understood in the present context to represent the edges of the ridge of an otherwise permanent ridge waveguide structure. The structure is shown more clearly in a cross-sectional view, FIG. 9, taken along a line C—C identified in FIG. 8. Referring to the figures, there is shown a thermo-optic applicator 960 positioned predominantly to one side of the ridge 910, preferably so that its left edge 961 is vertically aligned with the left edge of the ridge, denoted by a vertical line 911 that intersects 811. The right edge of the ridge is denoted by a vertical line 912 that intersects 812. The applicator is wider than the ridge, as shown, with its right edge 962 extending beyond 912 preferably to a distance substantially equal to the width of the ridge.

In respects other than the positioning and width of the applicator, the preferred asymmetrical embodiment is substantially similar in construction to the thermo-optically actuated (symmetrical) planar anti-waveguide routing structure described with reference to FIG. 3. The operation of the preferred embodiment is substantially as described above for an asymmetrical planar embodiment, after first reference to FIG. 8, with the exception that references to "core" should be substituted by "ridge region"; "side cladding adjacent to the core", by "region immediately laterally outside the ridge"; and "refractive index difference between core and side cladding adjacent to the core", by "δn".

Alternatively in the thermo-optically actuated embodiments of this invention, including asymmetrical embodiments, an applicator may be situated under a core and separated from it by a lower cladding layer. For example with reference to FIG. 3 an applicator 360 may be situated not on top of the upper cladding layer 320 but, instead, under a ridge 310 and a lower cladding layer 330, and on top of a substrate, not shown. Suitable modification of the lower cladding layer thickness, and of the fabrication procedure as described herein with reference to FIG. 5, will in that case be required as apparent to those skilled in the art.

Actuation by means of the electro-optic effect may alternatively be used in the invention. Electro-optic actuation may be beneficial for applications that require faster switching or light redirection than obtainable with thermally activated switches. This will require suitable modification of the applicator to apply an electric field to the materials of the anti-waveguide routing structure, upon activation by an applied voltage, and, further, modification of the choice of materials to provide appropriate electro-optic coefficients such that, upon activation of the applicator, the refractive index difference between at least a portion of the core and the adjacent surrounding cladding will become negative.

Figure 10:
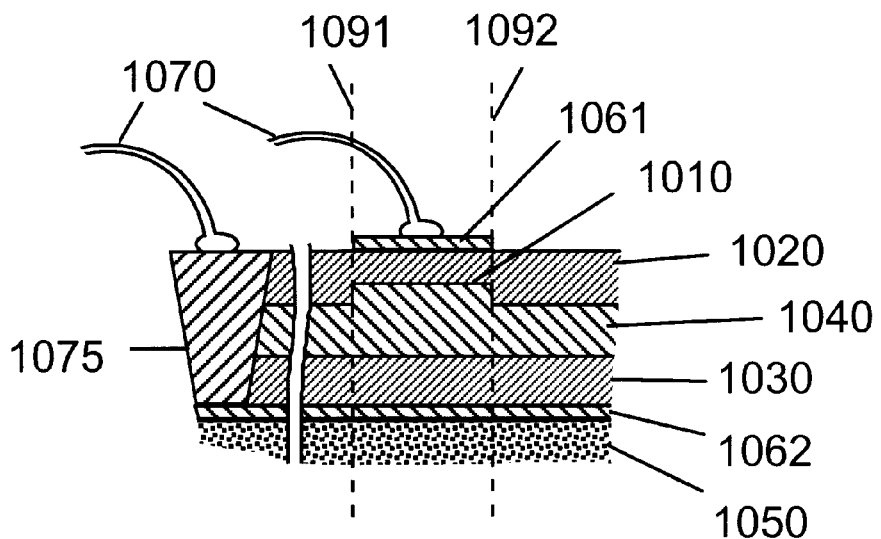
FIGS. 10 and 11 are cross-sectional views of electro-optically actuated embodiments of the invention.

Referring to FIG. 10 there is shown in cross-sectional view an electro-optically actuated planar embodiment of the invention, comprising a ridge waveguide structure with upper cladding layer 1020, lower cladding layer 1030, an slab core layer 1040, a ridge 1010 that is a thicker section of the core layer that serves to define the confinement region and provide lateral confinement of light according to known art, as described with reference to FIG. 3, an upper electrode 1061, and a ground plane electrode 1062, fabricated on a substrate 1050.

The structure may be fabricated by depositing an electrically conductive metallic layer that forms the ground plane electrode 1062, on a substrate 1050, by a known process such as sputtering, or alternatively, by evaporation. A lower cladding 1030 with refractive index less than the core layer 1040 is deposited on the metallized substrate by a known process, such as spinning. An electro-optic material that forms the core layer 1040 is then deposited to a thickness that allows at least single mode propagation to occur. A layer of photoresist is deposited on the electro-optic core layer 1040, exposed through a mask, and developed to leave a protective stripe pattern with the desired width of the waveguide ridge 1010. The width is selected according to known art to achieve single mode operation upon completion of the structure, as described with reference to FIG. 3. A thickness of the core layer 1040 is removed in the unprotected area, by a known process such as laser ablation, or alternatively by RIE or another known etching process, to fabricate a ridge 1010. The photoresist stripe pattern is removed and a low-refractive index upper cladding layer 1020 deposited. The upper and lower cladding layers 1020 and 1030 are made sufficiently thick to prevent evanescent optical mode tails from extending significantly into the electrodes 1061 and 1062. The structure is then electric field poled using a corona poling process, or alternatively another electric field alignment process such as contact poling, as known in the art and described for example in Burland, D. M. Miller, R. D., and Walsh, C. A., *Chemical Reviews* 94 31–75 (1994), incorporated herein by reference, to induce second-order nonlinear optical properties and consequent electro-optic response when subjected to an electric field. Some nonlinear optical materials that can alternatively be suitable for the core layer 1040, such as those intrinsically lacking inversion symmetry, such as Langmuir-Blodgett or ionic self assembled films, may not require electric field poling in order to have electro-optic response when subjected to an electric field. A metal film is then deposited and patterned to form an upper electrode 1061, in substantially the same manner as described to form the ridge 1010, excepting that a metal etch is employed to remove all of the metal layer in the unprotected area. The upper electrode preferably has substantially the same width as the ridge and is preferably aligned to be directly above it, as indicated by the vertical dashed lines 1091 and 1092, and its length in the otherwise permanent waveguide direction is limited. Electrical contacts such as wire bonds 1070 are made to the electrodes 1061 and 1062. Access to the ground plane electrode 1062 may be provided by known means used in semiconductor and microelectronics packaging, such as a via opening formed through the waveguide layers, that may be selectively metal coated and/or electroplated as indicated schematically by 1075.

In operation, the electro-optic applicator is activated by a control voltage from control unit 190 (FIG. 1), applied between the electrodes through the contact wires 1070, thereby modifying the refractive index of a portion of the core material in proximity to the upper electrode 1061. Upon application of a voltage with a bias reverse to that of the original poling field, the refractive index will decrease proportionally to the electro-optic coefficient and the applied voltage, which determines the degree of actuation. At a sufficient voltage the effective refractive index of the portion of the ridge region 1010 that is under 1061 will decrease below that of the region immediately laterally outside the ridge, and a segment of anti-waveguide will be formed. Light propagating in the waveguide, toward the applicator, becomes redirected while traveling in the anti-waveguide section under the applicator into two paths on either side of the ridge, while remaining substantially vertically confined in the plane of the core layer 1040. Other than the applicator and the mechanism for creating a refractive index change, the operation of the electro-optically actuated ridge waveguide embodiment is substantially similar to that of the thermo-optically actuated embodiment, described above with reference to FIGS. 3, 4, and 7. The length of the upper electrode 1061 is chosen to be sufficient to provide deflection of light without coupling back into the waveguide section beyond the upper electrode, for a given degree of actuation.

Figure 11:
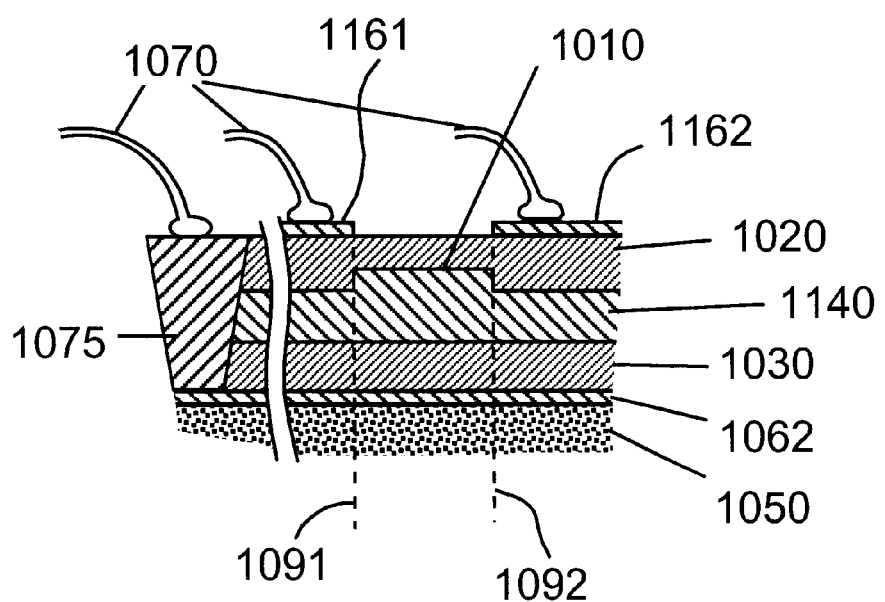

FIG. 11 is a cross-sectional view illustrating an alternative electro-optically actuated planar embodiment. The structure is the same as that of FIG. 11, except that the core layer 1040 has been replaced by a different material 1140 which has a positive electro-optic coefficient, and the upper electrode 1061 over the ridge 1010 has been replaced by two upper electrodes 1161 and 1162 laterally outside the ridge 1010, adjacent to the ridge on either side thereof.

In operation, the electro-optic applicators are activated by a control voltage from control unit 190 (FIG. 1), applied between the electrodes 1161 and 1162, on the one hand, and ground plane 1062 on the other hand, through the contact wires 1070, thereby modifying the refractive index of the portions of the core material under each of the electrodes 1161 and 1162. Upon application of a voltage with a bias similar to that of the original poling field, the refractive index in these regions laterally outside the ridge region 1010 will increase proportionally to the electro-optic coefficient and the applied voltage. At a sufficient voltage the effective refractive index of the portions of the core layer that are under the electrodes 1161 and 1162 will increase above that of the ridge region 1010, and a segment of anti-waveguide will be formed. As in the embodiment of FIG. 10, light propagating in the waveguide toward the applicator, will become redirected while traveling in the anti-waveguide section between the applicators 1161 and 1162 into two paths on either side of the ridge, while remaining substantially vertically confined in the plane of the core layer 1040.

In applications where lower optical loss is desirable, a strip-loaded waveguide structure may be employed in place of the ridge waveguide structure shown in FIG. 10. The strip-loaded structure is a known type of ridge waveguide wherein the ridge is made of a different material than the extensive slab core layer. In a ridge waveguide and also in the strip-loaded structure, most of the light in a normal optical mode, as denoted by 380 in FIG. 3, travels in the extensive slab part of the core layer as indicated.

Accordingly, an alternate electro-optically actuated embodiment of the invention comprises a strip-loaded waveguide structure substantially similar to the electro-optically actuated embodiment described with reference to FIG. 10, with the exception that the core layer is an extensive slab waveguide made of an optical material that has low loss but no significant electro-optic properties, upon which is deposited a strip material that has significantly large electro-optic properties but can have higher optical loss. The strip material is patterned and formed into a shape similar to a ridge, thereby providing waveguide confinement laterally according to known art, as described with reference to the ridge waveguide and FIG. 3. The strip material is preferably a layer of electro-optic polymer with thickness in the range of 0.1 to 0.5 $\mu$m and a refractive index slightly greater than that of the upper cladding. In the resulting strip-loaded waveguide structure, most of the light in a normal optical mode travels in the low-loss optical material, and consequently the strip-loaded waveguide will experience less optical loss than a comparable ridge waveguide with an electro-optic core. A further desirable feature of the structure is that it is less sensitive to excessive width and spatial misalignment of the upper electrode to the strip ridge, as the electro-optic coefficient is large only in the strip ridge and not in the other parts of the structure. Consequently the refractive index of a slab core region immediately laterally outside the ridge, that may be directly under a part of the upper electrode, will not be changed upon actuation, and the structure will respond substantially equivalently to a ridge waveguide structure with a more accurately fabricated upper electrode.

Yet another alternate electro-optically actuated embodiment has an asymmetrically positioned upper electrode but is otherwise substantially similar to the embodiment described with reference to FIG. 10, which employs a ridge waveguide structure. In the asymmetrical electro-optic embodiment the upper electrode is positioned to one side of the center line of an otherwise permanent ridge waveguide while remaining parallel to and partially overlapping the ridge region as well as an adjacent region immediately laterally outside the ridge, which both have substantially the same electro-optic coefficient. Thus upon actuation to a sufficient degree, a weakly confining $\delta$n is preserved on the overlapping side but an anti-waveguiding region is created on the opposite side of the waveguide, away from the upper electrode. Other than the applicator and the form of activation (how a refractive index change is created), the operation of the electro-optically actuated asymmetrical ridge waveguide embodiment of the invention is substantially similar to that of the thermo-optically actuated asymmetrical ridge waveguide embodiment, described above with reference to FIGS. 8 and 9.

An electro-optic applicator in the form of a ground plane electrode and a narrow upper electrode of limited length has been described, but other physical arrangements of the applicator, shape of the cladding surfaces upon which it rests, and connecting means may alternatively be used.

Another preferred embodiment is a vertical version of the invention employing a thermo-optically actuated structure, that may be described with reference to FIG. 2. The operation of this first preferred vertical embodiment is substantially similar to that of the previous embodiments. An activation current is applied to the applicator situated substantially over the waveguide. The current flow in the resistive applicator generates heat that flows through the optical waveguide structure toward cooler regions farther from the applicator. The optical waveguide structure is fabricated preferably from polymer materials wherein an increase in temperature results in a decrease in refractive index, by the thermo-optic effect.

Heat flows from the applicator towards the substrate which preferably acts as a heat sink. The heat flow through the structure is associated with a temperature gradient through the material. It will be appreciated that an alternative or additional heat sink may be employed to enhance the thermal gradient, a heat sink fabricated from a glass or other material having a relatively high thermal conductivity so as to efficiently remove heat. The temperature gradient produces, through the thermo-optic effect, a refractive index varying with depth beneath the applicator. This is shown schematically in FIG. 15 for an optical waveguide structure composed of materials with matched, or substantially equal, dn/dT values. In this embodiment the core layer of the waveguide preferably has a negative dn/dT that is substantially similar to that of the cladding layers such that the same temperature rise results in a substantially similar decrease in refractive index in each layer. Temperature at different distances from the applicator along a vertical line such as 290 shown in FIG. 2, is indicated by curve 1510 in FIG. 15, and the upper and lower interfaces of the core with the respective, cladding layers are denoted by dashed lines 1520 and 1530, respectively.

The overall refractive index profile of the waveguide structure with and without activation is indicated by the curves 1550 and 1540, respectively, in FIG. 15. Without activation it is clear that the structure is capable of acting as an optical waveguide with vertical confinement of light. However, with the degree of activation shown in the figure, the optical waveguide is effectively erased and the refractive index of a portion of the core layer (in particular the shallowest portion of the core layer) is reduced below that of the adjacent lower cladding layer. The temperature gradient within the optical waveguide structure must be steep enough to provide a significant temperature difference between the upper and lower interfaces of the core layer, such that the refractive index of the upper interface of the core is decreased substantially below that of the lower interface of the core. Although there is still a refractive index step at the boundary between the core and cladding layers, the refractive index of at least a part of the core is reduced below that of the lower cladding layer, enabling light to tunnel through the index barrier into the higher index of the lower cladding layer, thus creating an anti-waveguide region beneath the applicator.

At the degree of activation resulting in a refractive index profile as shown in FIG. 15, the light propagating in the otherwise permanent waveguide before the anti-waveguide section is preferentially deflected towards and into the lower cladding layer, in the anti-waveguide section, by a combination of diffraction and refraction, as a result of both removal of waveguide confinement in a direction vertically away from the applicator and a relatively higher refractive index in the lower cladding layer compared to the core layer.

In the first preferred vertical embodiment the light is not deflected in the lateral or horizontal direction because actuation preferably does not substantially affect waveguide confinement in the lateral direction. The thermal or temperature gradient in the lateral, or horizontal, direction is arranged to be significantly smaller than in the vertical direction, as controlled by the width of the applicator. A wide applicator, that is, for example, one with a width wider than the waveguide core, can provide a substantially uniform temperature profile across the core and laterally adjacent cladding regions, resulting in substantially similar refractive index decreases within the laterally adjacent regions, thus preserving lateral waveguide confinement.

The first preferred vertical embodiment provides for efficient deflection of light from an otherwise permanent waveguide into a preferential direction away from the applicator, in a structure that operates in a manner substantially independent of ambient temperature variations. Because of substantially similar values of dn/dT in the polymer layers comprising the structure, a change of ambient temperature produces only a uniform temperature change throughout the structure and thus does not change the shape of the refractive index profile, resulting in a refractive index structure and waveguide confinement that are substantially independent of the ambient temperature of the device. The operation of the device, on the other hand, relies on creation of a vertical temperature gradient through the waveguide core.

In a second preferred vertical embodiment, vertical deflection of light from the otherwise permanent waveguide is achieved by constructing an optical waveguide structure that has stronger confinement in the lateral (horizontal) direction than in the vertical direction away from the applicator. This may be provided by depositing side cladding regions with a lower effective refractive index than the core region in a structure as shown in FIG. 2. It is preferably provided by a ridge waveguide structure as shown in FIG. 3 wherein the ridge depth is chosen such that the structure remains laterally confining, that is, ridge region 310 of the core layer 340 having a larger effective refractive index than the region immediately adjacent to and outside the ridge, also while actuated to the maximum expected degree. Such ridge depth may be significantly larger than the ridge depth for the planar embodiments described hereinabove with reference to step 530 of FIG. 5. In the limit of a ridge etched all the way through the core layer, the structure becomes a rectangular, or square-profile, channel waveguide core surrounded above and laterally by an upper cladding layer 320. The upper cladding layer 320 is chosen to have a refractive index value smaller than that of the core layer, to provide strong confinement of light vertically in the direction towards the applicator.

The lower cladding layer 330 is chosen to have a refractive index value only slightly less than that of the core layer, thereby providing weak confinement vertically away from the applicator.

The values of dn/dT in this embodiment may be different in the different layers, provided that the light confinement remains as desired, throughout the specified ambient temperature range of the device for a given application.

The operation of the second preferred vertical embodiment is similar to that of the said first, and may be explained also with reference to FIG. 15, with references to the core being here understood to mean the ridge region, and the distance from the applicator being measured along a line 390 as shown in FIG. 3. In operation when the heater is actuated, a temperature gradient is created whereby a portion of the ridge region under the applicator, being closer to the applicator, is hotter than the portion of the lower cladding layer situated adjacent to and immediately vertically below the ridge. Consequently, owing to a large negative thermo-optic coefficient of the core material, an anti-waveguide structure is created in the otherwise permanent optical waveguide section under the applicator, in the vertical direction away from the applicator, when actuated to a sufficient degree. Light propagating in the normal waveguide section before the applicator is consequently forced to deflect out of the ridge region in a vertical direction away from the applicator.

Self-aligned fabrication may be employed to construct an anti-waveguide routing structure of this invention, whereby the same pattern of material is used to form both an optical waveguide and an applicator. This provides more accurate positioning of the applicator directly above a section of the waveguide, than a construction method wherein the parts are formed separately by two successive patterning steps, with alignment in between.

Figure 12:
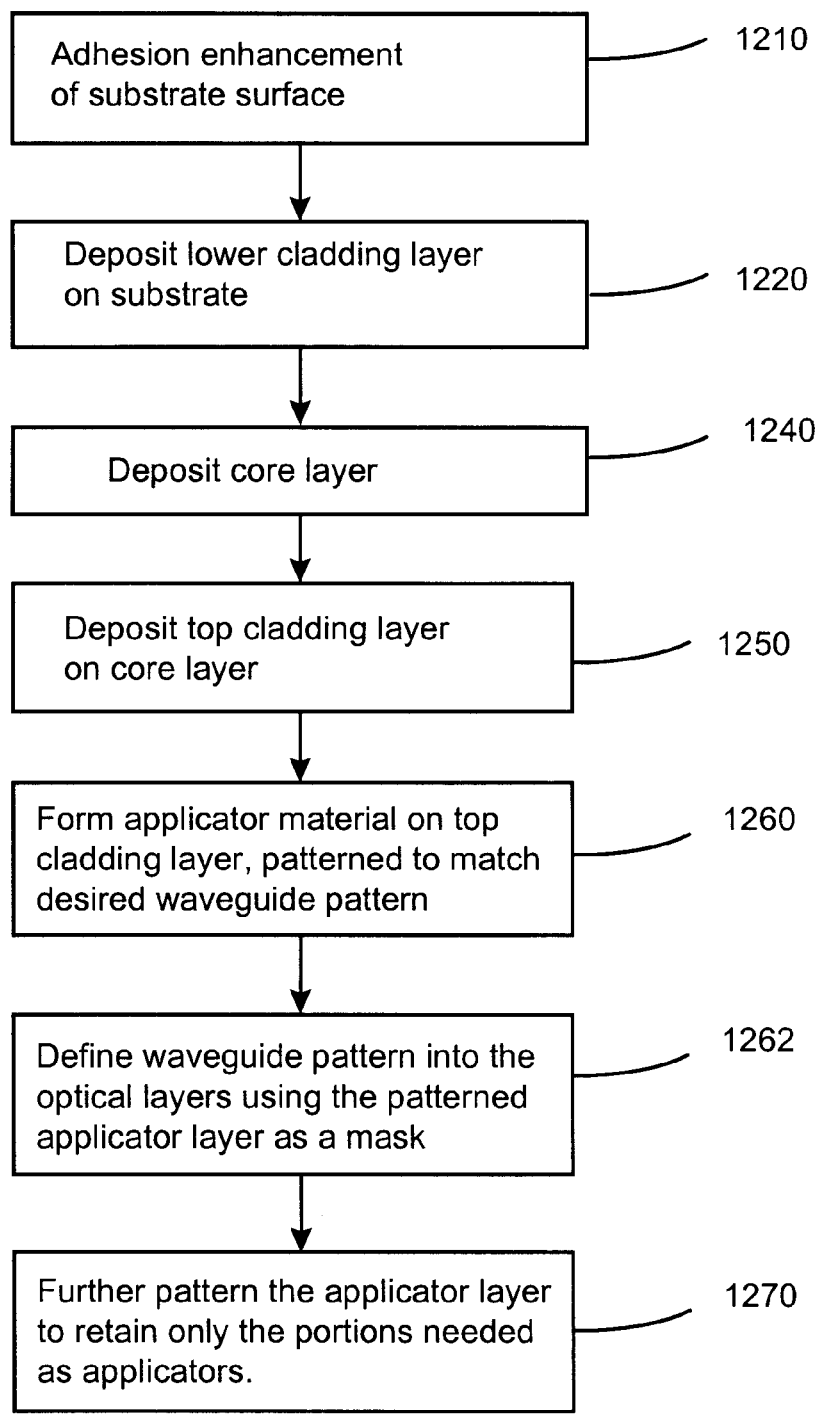
FIGS. 12 and 13 are flow charts describing self-aligned fabrication procedures incorporating features of the invention.

An embodiment of the invention employing an optical channel waveguide, as depicted in FIGS. 1 and 2, may be constructed by a self-aligned fabrication method in which the waveguide is photodefined. The self-aligned photodefined method is set forth in the flow chart of FIG. 12, and may be most easily understood as a modification of the preferred procedure described with reference to FIG. 5. Referring to FIG. 12, the self-aligned photodefined fabrication procedure begins in step 1210 with adhesion enhancement of the substrate surface. In step 1220, the lower cladding layer is deposited on the substrate, and in step 1240, a core layer is deposited. In step 1250, the upper cladding layer is deposited above the core layer. Steps 1210, 1220, 1240 and 1250 are the same as described above with respect to steps 510, 520, 540 and 550 in FIG. 5, but note that the step 530 of defining and etching inverted ridges on the lower cladding is omitted. Thus after step 1250 the procedure has created a preliminary unpatterned article.

In step 1260, applicator material, patterned initially to match the desired pattern of waveguides in the body of the article, is formed on the top cladding layer. The applicator material can be either a heater material (for thermo-optic embodiments) or electrode material (for electro-optic embodiments), for example. It can be formed in any number of conventional ways, such as by coating the top surface of the top cladding with the material and patterning it lithographically. The pattern of the applicator material formed in step 1260 typically includes stripes of the width desired for the ultimate waveguides in the body of the article, and extending longitudinally along the desired waveguide direction.

In step 1262, the waveguide pattern is defined into the body of the article using the patterned applicator layer as a mask in a manner hereinafter described. Subsequently, in step 1270, the applicator layer is further patterned to delimit the length of applicator segments in the waveguide direction to the lengths desired for the final applicator pattern, and to make electrical contacts.

The step 1262 of defining the waveguide pattern into the body of the article can be accomplished in several different ways. In a first embodiment, the core material is a photobleachable polymer known in the art, such that its refractive index becomes permanently decreased as a result of irradiation with light of suitable wavelength, for suitable time duration, in the area unprotected by the opaque applicator stripe. The refractive index of the core layer under the stripe remains unaffected and thereby forms the higher-refractive index core of a rectangular channel waveguide that has a width substantially equal to and well aligned with the applicator stripe.

In an alternate, second embodiment, which may be referred to as an etch-and-refill waveguide process, instead of illuminating the patterned area, an RIE process such as that described above with respect to step 530 (FIG. 5) can be employed to etch through the upper cladding layer and also a predetermined distance into the core layer, to form a ridge structure. If a photoresist was used to pattern the applicator stripes, the same photoresist can be retained on the applicator stripes to protect them against the RIE process. After etching, top cladding material is re-applied to the structure. Preferably, the top cladding material is re-applied first to a greater thickness to provide a substantially planarized surface, and then thinned by RIE to the original application thickness of step 1250, thereby also exposing the applicator stripe. In some embodiments it will be acceptable to leave a polymer on top of the applicator metal.

Figure 13:
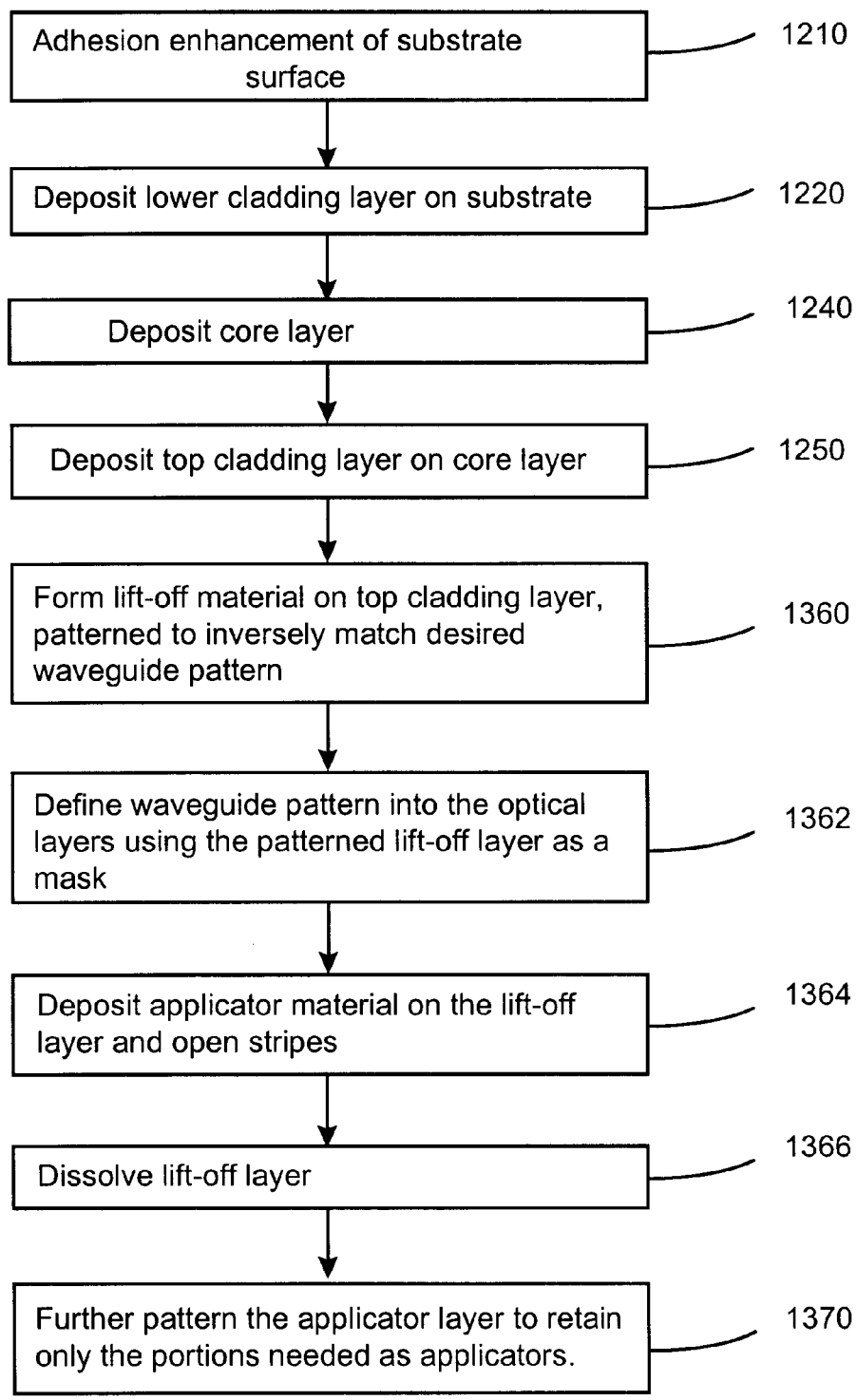

FIG. 13 illustrates yet another variation on the self-aligned fabrication method, using a negative photoresist and known lift-off process. In this embodiment, steps 1210, 1220, 1240 and 1250 are the same as in FIG. 12. Instead of forming applicator material as in step 1260, however, a light-blocking lift-off material is formed and patterned to inversely match the waveguide pattern desired for the body of the article (step 1360). The lift-off layer can be formed by first applying a lift-off polymer, then a light blocking material layer, and finally a negative photoresist material. The stripe pattern is then exposed through a mask and developed, leaving the stripe area open and the rest of the area protected by hardened photoresist. The light blocking material layer is etched out in the stripe area, and the lifting layer is also removed by a suitable etching means such as RIE. Alternatively a positive photoresist and an inverse stripe mask may be employed. As yet another alternative, a suitable material may serve as a combined negative photoresist, light blocking layer, and lifting material, simplifying the process as will be apparent to those skilled in the art. With the lift-off process, the applicator stripe area is open, while the rest of the surface is protected by the light blocking material on top of the lifting layer, or alternatively by the lifting layer that is also a light blocking layer.

In step 1362, the waveguide pattern is defined into the article by irradiating the article through the upper cladding layer with ultraviolet light, or light of another suitable wavelength range. The core material is a known glass, or alternatively a polymer material, whose refractive index becomes permanently increased as a result of irradiation with ultraviolet light, or alternatively, with light of another suitable wavelength range. Such glass material and irradiation process are known and used to make fiber Bragg gratings in optical fiber for application in fiber optic communication networks. See also Chandross U.S. Pat. Nos. 3,809,732, 3,809,696, 3,993,485, and 3,953,620, all incorporated herein by reference. The upper cladding layer is transparent to, and unaffected by the light. The refractive index of the core layer in the rest of the structure thus retains its original value, while the stripe area becomes a higher-refractive index confinement region of a rectangular channel waveguide.

In step 1364, after irradiation, applicator material is deposited on the structure, both on the upper cladding layer, within the open stripe, and on the metal and lifting layer, elsewhere. In step 1366 the lifting layer is then dissolved with suitable agitation, by a known process, thereby lifting off the applicator material in the area outside the stripe and forming the applicator stripe that has a width substantially equal to and well aligned with the waveguide confinement region. Further patterning of the applicator proceeds as described for the other self-aligned processes (step 1370).

FIG. 14 is a plan view of an asymmetric planar optical switch according to the invention, in which optical energy that escapes the confinement region 1410 when the device is in its "on" state follows a path. 1412 through the planar waveguide toward a target structure 1414. The particular embodiment of FIG. 14 uses a thermo-optic ridge waveguide 1416 below the top cladding layer 1418, and an asymmetrically positioned heating element 1420 superposing the full width of a particular length of the ridge, and extending by an equal width laterally beyond the right-hand edge of the ridge. However, any switching structure described herein can be used. The target structure 1414 can be a detector, for example, or an out-of-plane deflector. Other examples include display pixel structures, and the input end of a secondary output waveguide. The target 1414 is preferably spaced from the unswitched waveguide structure 1416 by some distance to ensure that it does not significantly interfere with the evanescent tail of the optical energy propagating therein when the switch is off. In addition, the target 1414 is also disposed at the proper lateral distance from waveguide 1416 to capture the largest possible fraction of the optical energy escaping along path 1412 from the confinement region 1410. That position is laterally farther away from the unswitched waveguide 1416 (for a given longitudinal position along waveguide 1416) where the switch is operated in an anti-waveguide on-state, than it would be if the switch were operated merely to suppress waveguiding, because in the former case escaping light diverges from the unswitched waveguide 1416 due to refractive as well as diffractive effects, whereas in the latter case it diverges due only to diffractive effects. Light in the former case therefore diverges from the unswitched waveguide 1416 at a greater angle.

As used herein, the terms "above" and "below" are intended to be interpreted transitively. That is, for example, if layer A is above layer B which is above layer C, then layer A is also above layer C.

Also as used herein, a given event is "responsive" to a predecessor event if the predecessor event influenced the given event. If there is an intervening processing step or time period, the given event can still be "responsive" to the predecessor event. If the intervening processing step combines more than one event, the output of the step is considered "responsive" to each of the event inputs. If the given event is the same as the predecessor event, this is merely a degenerate case in which the given event is still considered to be "responsive" to the predecessor event. "Dependency" of a given event upon another event is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, all embodiments shown or described herein using one form of activation (thermo-optic, electro-optic, acousto-optic or magneto-optic), can instead be constructed using any of the other forms of activation, provided that materials are available with the desired positive or negative activation coefficients and other desired optical, mechanical and chemical properties. Also note that anti-waveguiding is not necessarily required in asymmetric planar case. Also note that in thermo-optic embodiments, the core material may be any material having a non-zero thermo-optic coefficient. Alternative materials to those specified herein include semiconductors such as Si, or GaAs, glass, and other amorphous materials, and crystals such as LN. Furthermore, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for switching an optical switch from a first state to a second state, said optical switch including a structure which in said first state provides confinement against propagation of an optical mode in at least a first direction out of a confinement region, comprising the step of reducing the refractive index of at least a first part of said confinement region to a value which is below the index of refraction of a first region of said switch outside of and adjacent to said confinement region in said first direction, while maintaining confinement in a second direction different from said first direction.

2. A method according to claim 1, wherein at least said first part of said confinement region has a negative thermo-optic coefficient;

and wherein said step of reducing comprises the step of heating at least said first part of said confinement region.

3. A method according to claim 2 wherein said first region of said switch is also thermo-optic.

4. A method according to claim 3, wherein said first region of said switch has a negative thermo-optic coefficient which is smaller in magnitude than the negative thermo-optic coefficient of said first part of said confinement region.

5. A method according to claim 3, wherein said first region of said switch has a positive thermo-optic coefficient.

6. A method according to claim 1, wherein said structure provides confinement in said first state against propagation of said optical mode also in a third direction orthogonal to said first direction.

7. A method according to claim 1, wherein said confinement region is elongated in a first dimension, and wherein said structure provides confinement in said first state against propagation of said optical mode out of said confinement region in all directions transverse to said first dimension.

8. A method according to claim 1, wherein said structure includes top and bottom cladding portions of a waveguide,
and wherein said first direction is toward said bottom cladding portion.

9. A method according to claim 1, wherein said structure includes top and bottom cladding portions of a waveguide,
and wherein said first direction is toward said top cladding portion.

10. A method according to claim 1, wherein said structure includes first and second lateral cladding regions on laterally opposite sides of said confinement region, said first lateral cladding region including said first region of said switch and said second direction being non-parallel to any plane passing through said first and second lateral cladding regions,
wherein said step of heating comprises the step of heating at least part of said confinement region until said first part of said confinement region has a refractive index which is below the index of refraction of a part of said second lateral cladding region adjacent said confinement region.

11. A method according to claim 1, wherein said structure includes first and second lateral cladding regions on laterally opposite sides of said confinement region, said first lateral cladding region including said first region of said switch,
wherein in said step of heating, when said first part of said confinement region has a refractive index which is below the index of refraction of said first region of said switch, no part of said confinement region has a refractive index which is below any part of said second lateral cladding region adjacent said confinement region.

12. A method according to claim 11, wherein said second direction is orthogonal to a plane passing through said first and second lateral cladding regions.

13. A method according to claim 1, wherein said step of reducing comprises the step of reducing the refractive index of said confinement region in a manner which is continuous at least in the dimension of said first direction.

14. A method according to claim 1, wherein said confinement region is an elongated region extending longitudinally through a first length, and wherein said step of reducing the refractive index of at least part of said confinement region to a value which is below the index of refraction of a first region of said switch outside of and adjacent to said confinement region in said first direction, comprises the step of:

reducing the refractive index of all of said confinement region along said first length thereof to a value which is below the index of refraction of said first region outside of said confinement region.

15. Optical switch apparatus including structure comprising a confinement region, a first region outside of and adjacent to said confinement region in a first direction, and an applicator, said structure having a first state in which said first part of said confinement region has a first state index of refraction, and in which said an optical mode traveling in said confinement region is confined against propagation in at least said first direction and a second direction different from said first direction, said structure further having a second state, entered in response to activation of said applicator, in which at least a first part of said confinement region has a refractive index which is below said first state index of refraction and further is below the index of refraction of said first region outside of and adjacent to said confinement region in said first direction, and in which confinement is maintained in said second direction.

16. Apparatus according to claim 15, wherein said confinement region is elongated in a first dimension, and wherein said structure provides confinement in said first state against propagation of said optical mode out of said confinement region in all directions transverse to said first dimension.

17. Apparatus according to claim 15, wherein said structure includes top and bottom cladding portions of a waveguide, and wherein said first direction is toward said bottom cladding portion.

18. Apparatus according to claim 15, wherein said structure includes top and bottom cladding portions of a waveguide, and wherein said first direction is toward said cladding portion.

19. Apparatus according to claim 15, wherein said structure includes first and second lateral cladding regions on laterally opposite sides of said confinement region, said first lateral cladding region including said first region of said structure and said second direction being non-parallel to any plane passing through said first and second lateral cladding regions, wherein in said second state said first part of said confinement region has a refractive index which is below the index of refraction of a part of said second lateral cladding region adjacent said confinement region.

20. Apparatus according to claim 15, wherein said structure includes first and second lateral cladding regions on laterally opposite sides of said confinement region, said first lateral cladding region including said first region of said structure and said second direction being orthogonal to a plane passing through said first and second lateral cladding regions, wherein in said second state, no part of said confinement region has a refractive index which is below any part of said second lateral cladding region adjacent said confinement region.

21. Apparatus according to claim 15, wherein in said second state said confinement region has a temperature gradient which is continuous at least in the dimension of said first direction.

22. A method for switching an optical switch from a first state to a second state, said optical switch including a structure which provides vertical confinement of an optical mode to a confinement region, and which in said first state further confines said optical mode against propagation of said mode into a first lateral region laterally adjacent to said confinement region in a first lateral direction from said confinement region, comprising the step of altering the refractive index profile of said switch such that a portion of said confinement region adjacent to said first lateral region has a lower refractive index than a portion of said first lateral region adjacent to said confinement region, while maintaining said vertical confinement of said optical mode.

23. A method according to claim 22, wherein said step of altering comprises the step of reducing the refractive index of at least said portion of said confinement region.

24. A method according to claim 22, wherein said step of altering comprises the step of increasing the refractive index of at least said portion of said first lateral region.

25. A method according to claim 22, wherein at least said portion of said confinement region has a negative thermo-optic coefficient, and wherein said step of altering comprises the step of heating at least said portion of said confinement region.

26. A method according to claim 25, wherein said first lateral region is also thermo-optic.

27. A method according to claim 26, wherein said first lateral region has a negative thermo-optic coefficient which is smaller in magnitude than the negative thermo-optic coefficient of said portion of said confinement region.

28. A method according to claim 26, wherein said first lateral region has a positive thermo-optic coefficient.

29. A method according to claim 22, wherein said structure provides confinement in said first state against propagation of said optical mode also in a second lateral direction opposite said first lateral direction.

30. A method according to claim 22, wherein said confinement region is elongated in a first dimension, and wherein said structure provides confinement in said first state against propagation of said optical mode out of said confinement region in all directions transverse to said first dimension.

31. A method according to claim 22, wherein said structure further includes a second lateral region laterally opposite said first lateral region across said confinement region, wherein said step of altering comprises the step of heating at least said portion of said confinement region until it has a refractive index which is below the index of refraction of a portion of said second lateral region.

32. A method according to claim 22, wherein said step of altering induces an index of refraction gradient in said confinement region which is continuous at least in the dimension of said first lateral direction.

33. A method according to claim 22, wherein said confinement region is an elongated region extending longitudinally through a first length, and wherein said step of altering comprises the step of:

altering the refractive index of said switch such that all of said confinement region along said first length thereof has a refractive index which is below the index of refraction of said first region outside of said confinement region.

* * * * *